United States Patent
Ikezawa et al.

(10) Patent No.: US 12,174,494 B2
(45) Date of Patent: Dec. 24, 2024

(54) LIGHT CONTROL MEMBER AND LIGHT CONTROL DEVICE

(71) Applicant: DAI NIPPON PRINTING CO., LTD., Tokyo (JP)

(72) Inventors: Takao Ikezawa, Tokyo (JP); Tomoya Kawashima, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 18/575,959

(22) PCT Filed: Jun. 24, 2022

(86) PCT No.: PCT/JP2022/025319
§ 371 (c)(1),
(2) Date: Jan. 2, 2024

(87) PCT Pub. No.: WO2023/282091
PCT Pub. Date: Jan. 12, 2023

(65) Prior Publication Data
US 2024/0337882 A1    Oct. 10, 2024

(30) Foreign Application Priority Data
Jul. 5, 2021    (JP) .................................. 2021-111316

(51) Int. Cl.
*G02F 1/1343*    (2006.01)
*G02F 1/1347*    (2006.01)

(52) U.S. Cl.
CPC ...... *G02F 1/134309* (2013.01); *G02F 1/1347* (2013.01)

(58) Field of Classification Search
CPC .......................... G02F 1/134309; G02F 1/1347
See application file for complete search history.

(56) References Cited

U.S. PATENT DOCUMENTS 6,646,697 B1 * 11/2003 Sekiguchi ........... G02F 1/13471
349/96
2012/0082805 A1    4/2012 Hatanaka et al.

FOREIGN PATENT DOCUMENTS

| JP | H09-118717 A | 5/1997 |
| JP | H10-506420 A | 6/1998 |
| JP | 2003-505561 A | 2/2003 |

(Continued)

OTHER PUBLICATIONS

Sep. 6, 2022 International Search Report issued in International Patent Application No. PCT/JP2022/025319.

*Primary Examiner* — Donald L Raleigh
(74) *Attorney, Agent, or Firm* — Oliff PLC

(57) ABSTRACT

A light control member and a light control device in which a non-electrode region is less visible. A light control film is a light control member having controllable transmissivity and includes: an undivided first common electrode; divided first electrodes; a first liquid-crystal layer disposed between the first common electrode and the first electrodes; an undivided second common electrode; divided second electrodes; and a second liquid-crystal layer disposed between the second common electrode and the second electrodes. First non-electrode lines dividing the first electrodes and second non-electrode lines dividing the second electrodes are arranged at positions not overlapping one another when viewed in the direction normal to the light control film.

14 Claims, 19 Drawing Sheets

(56) References Cited

FOREIGN PATENT DOCUMENTS

| | | | |
|---|---|---|---|
| JP | 2015-049316 | A | 3/2015 |
| JP | 2018-170268 | A | 11/2018 |
| JP | 2019-128376 | A | 8/2019 |
| JP | 2021-039279 | A | 3/2021 |
| WO | 01/07495 | A1 | 2/2001 |
| WO | 2010/150748 | A1 | 12/2010 |

* cited by examiner

FIG. 1
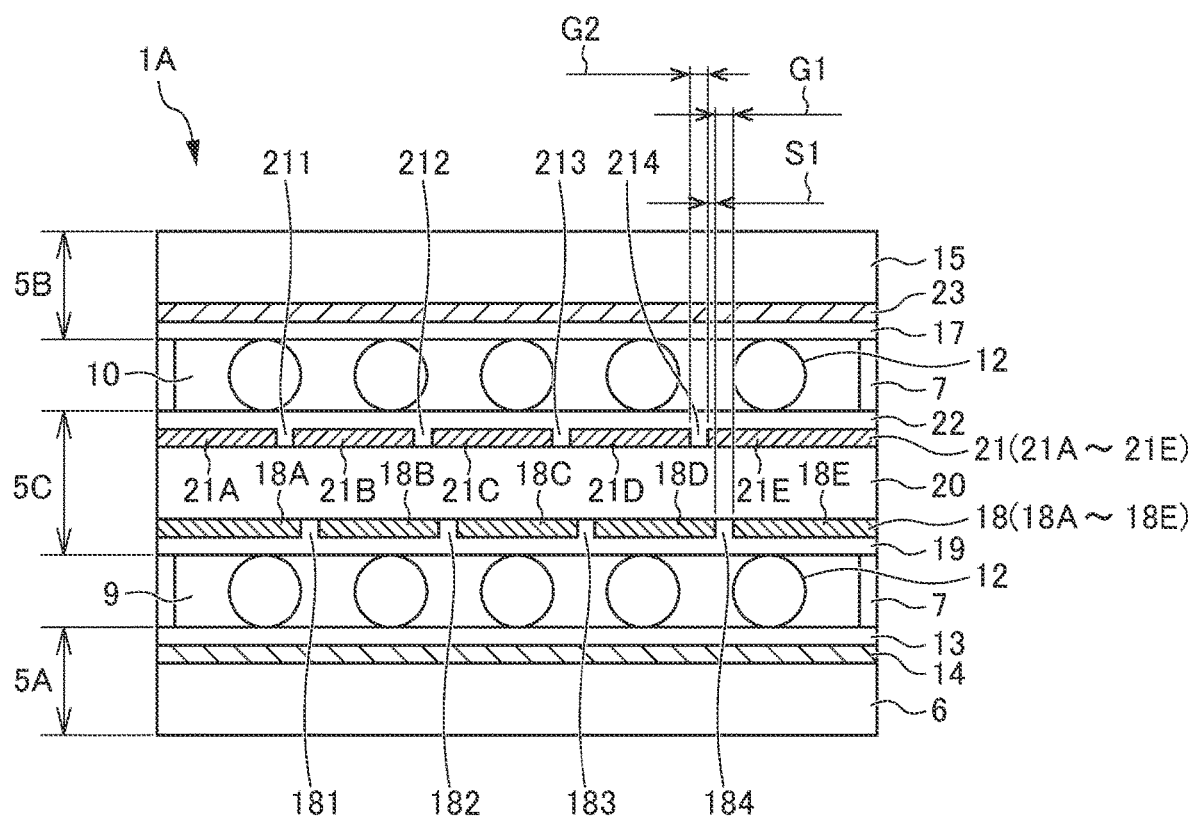
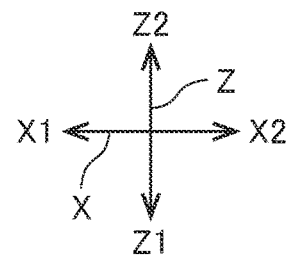

FIG. 6A
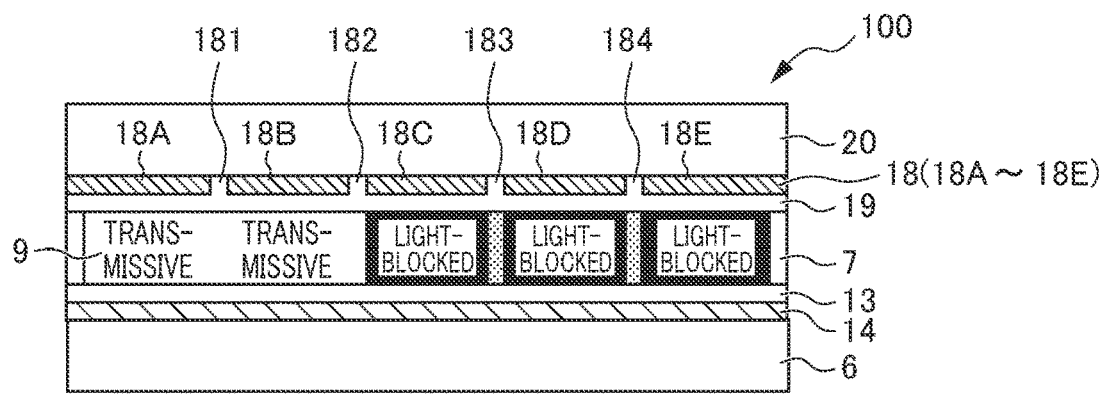
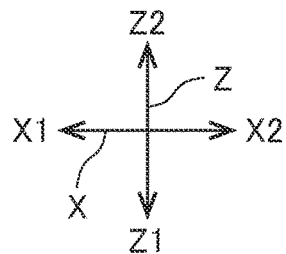
FIG. 6B
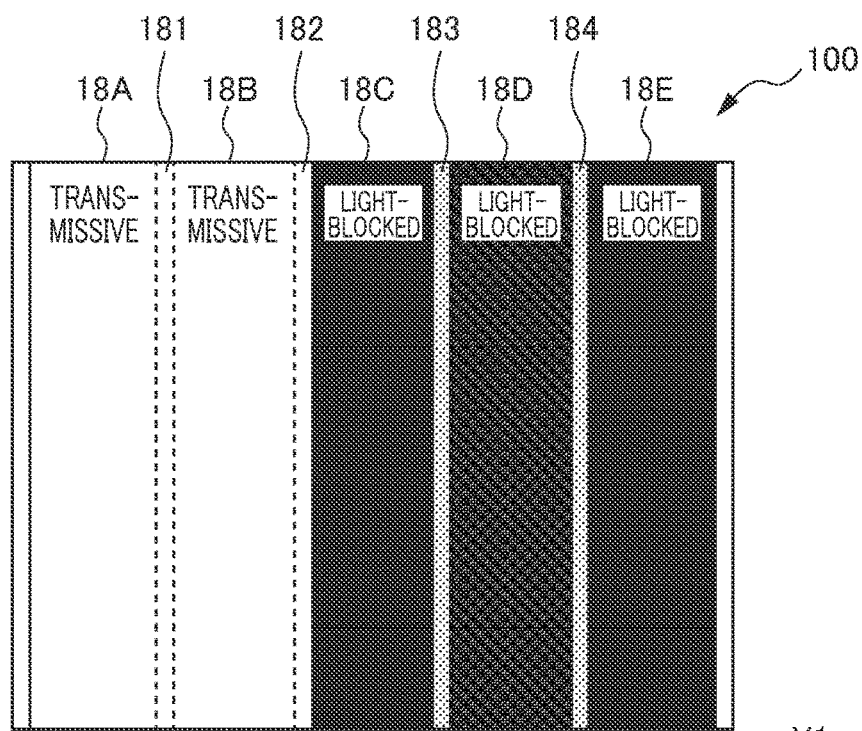
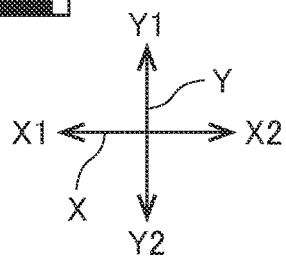

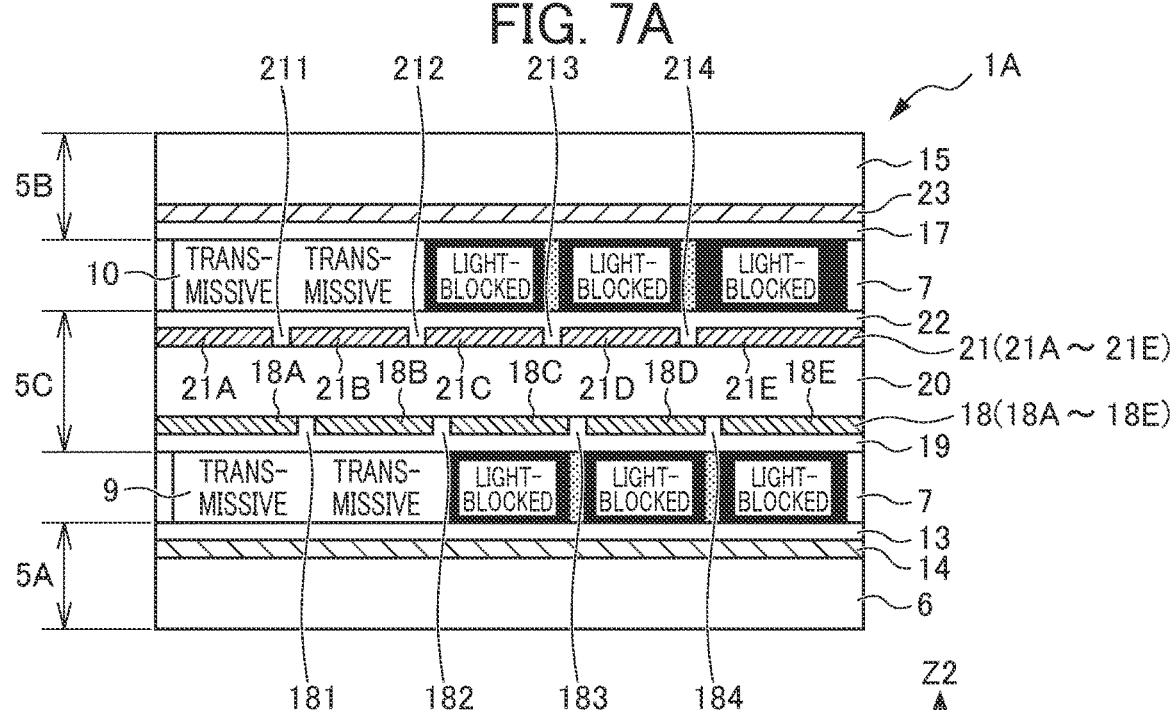
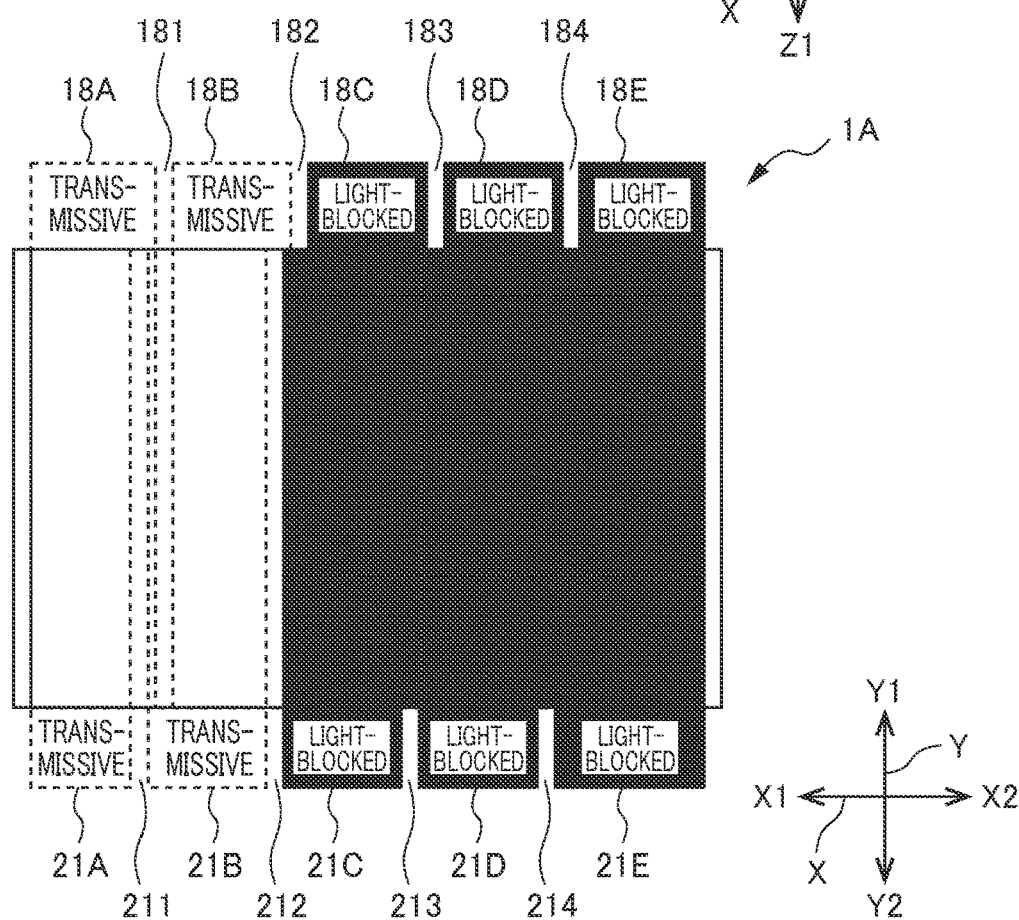

FIG. 9
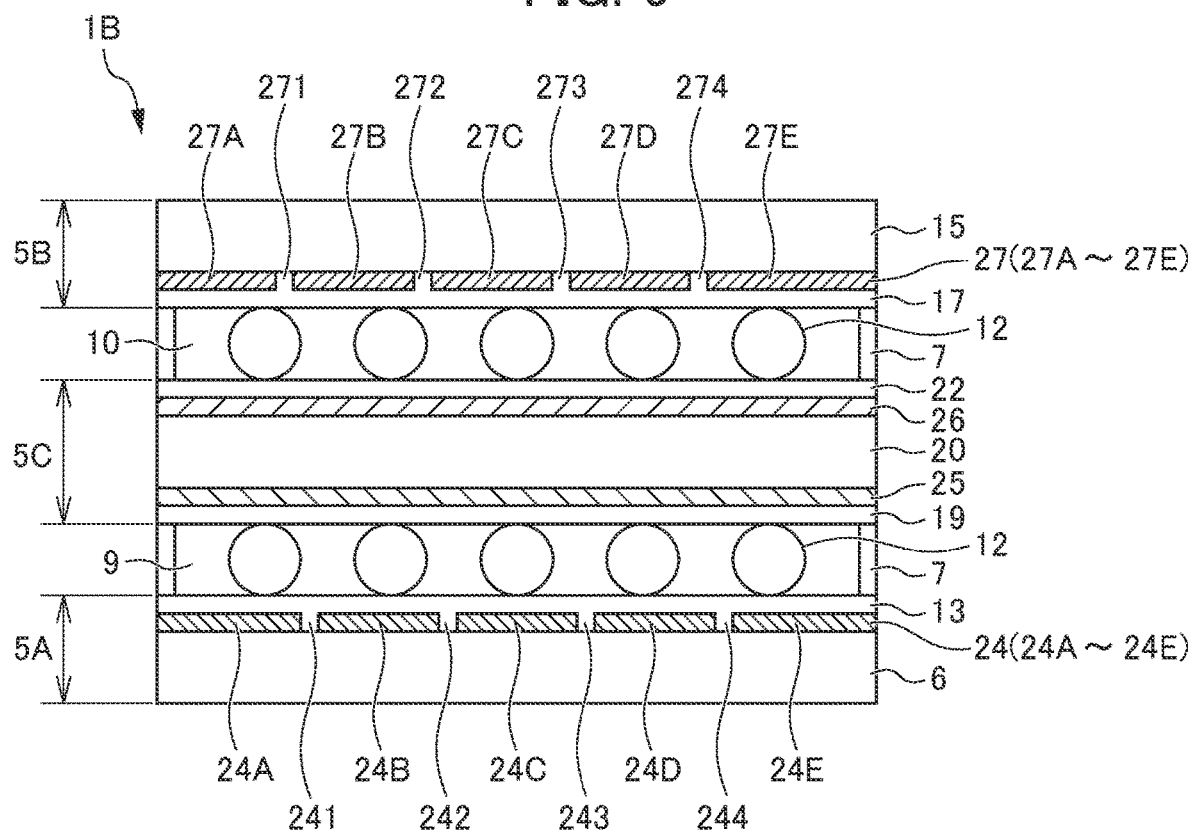
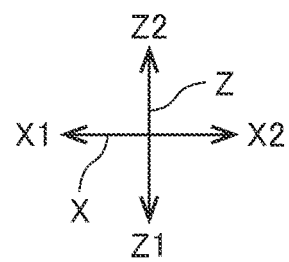

FIG. 10
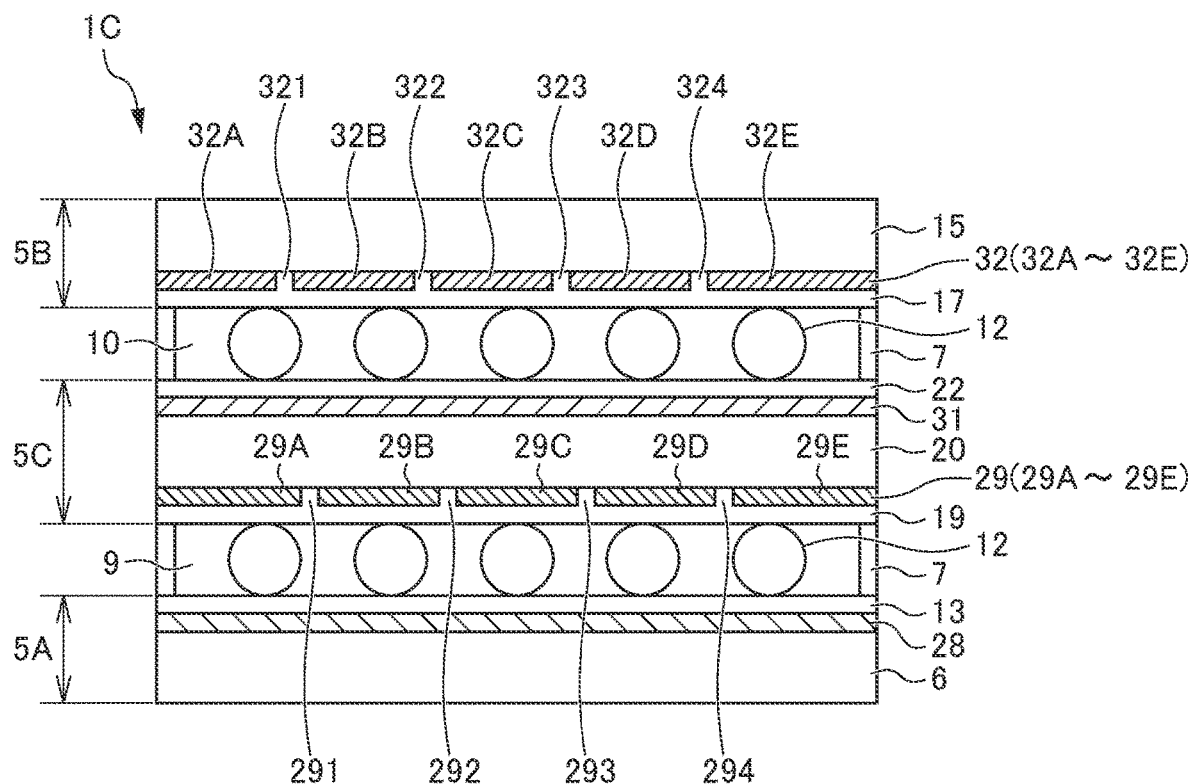
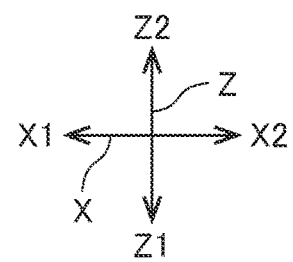

FIG. 13
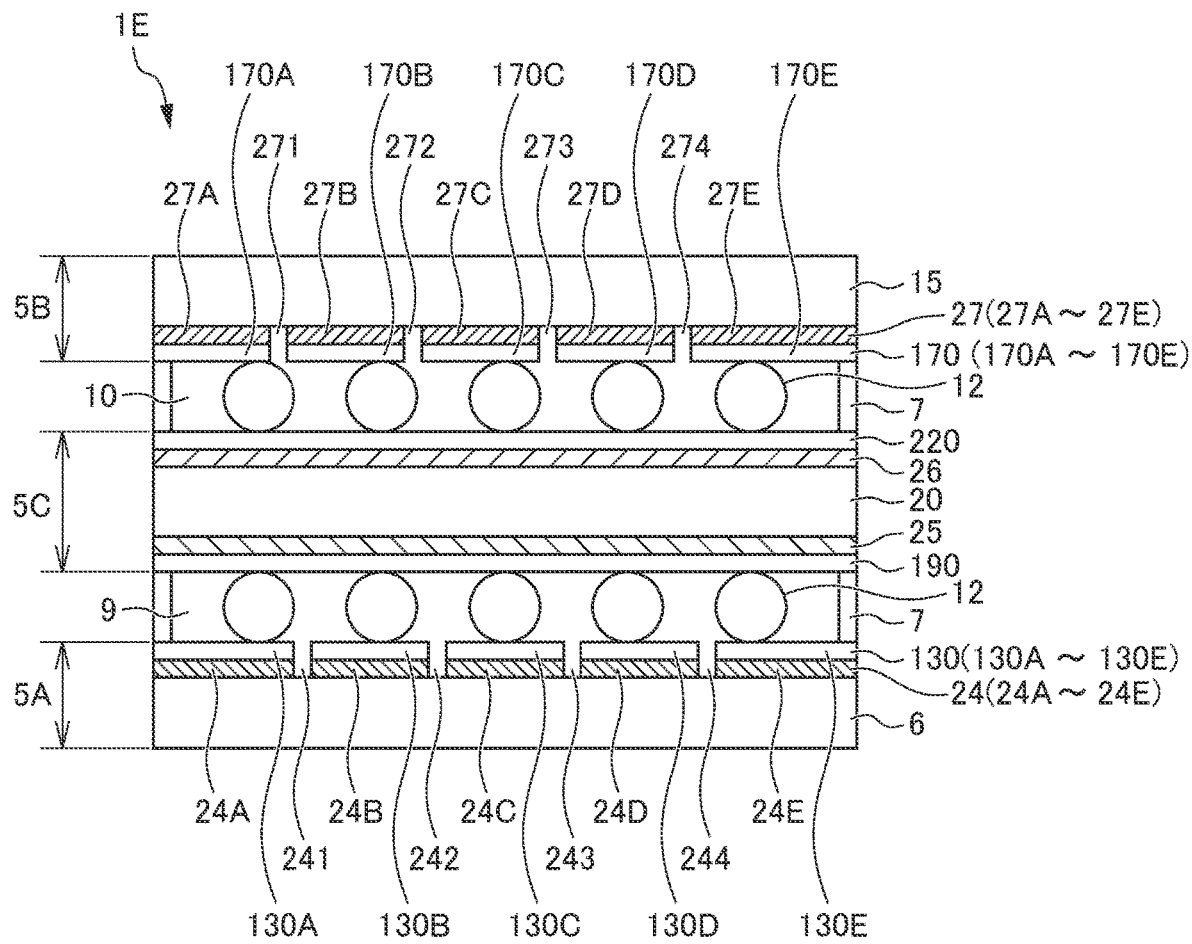
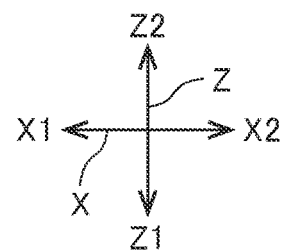

FIG. 15A
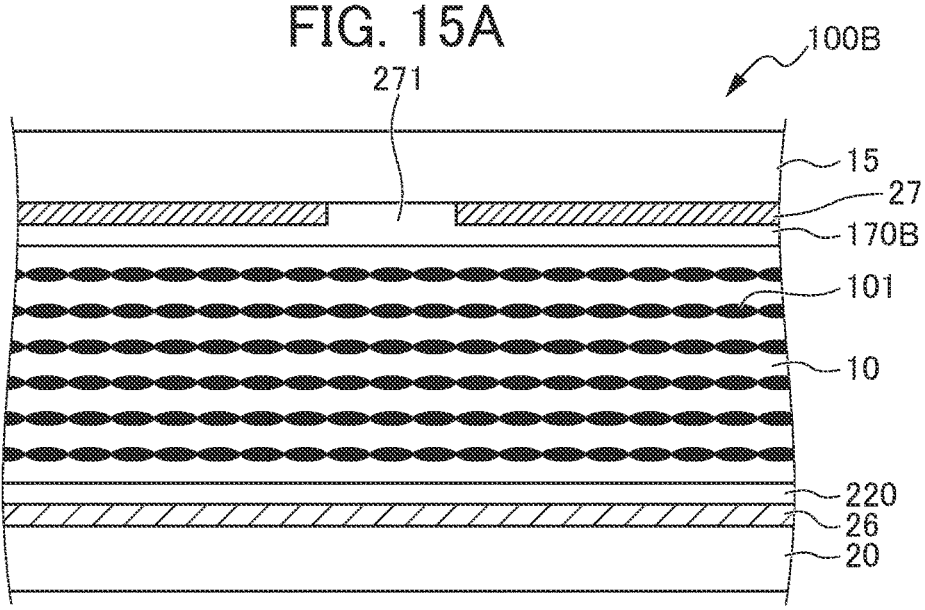
FIG. 15B
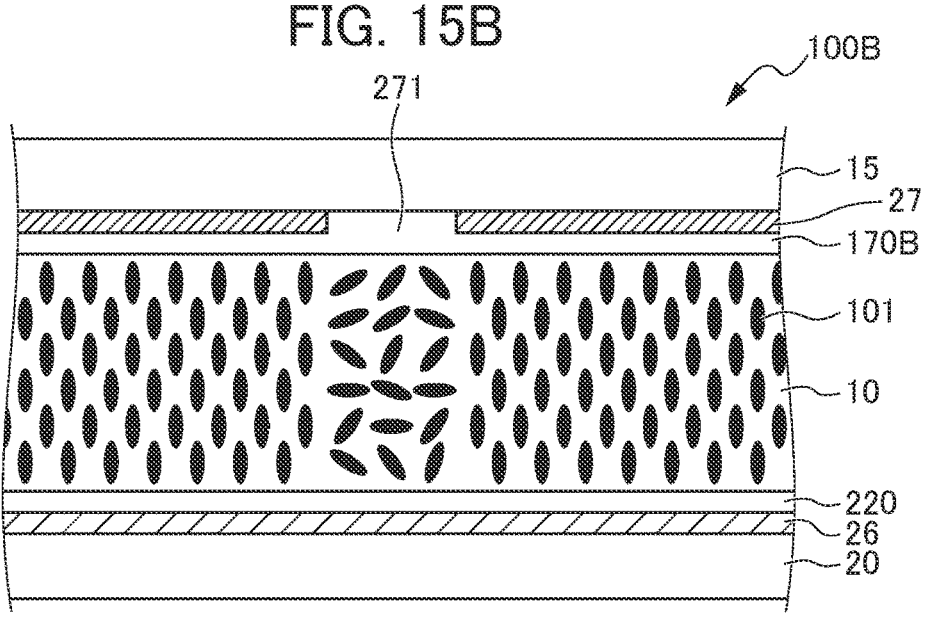
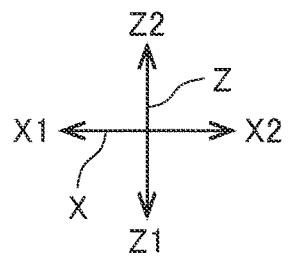

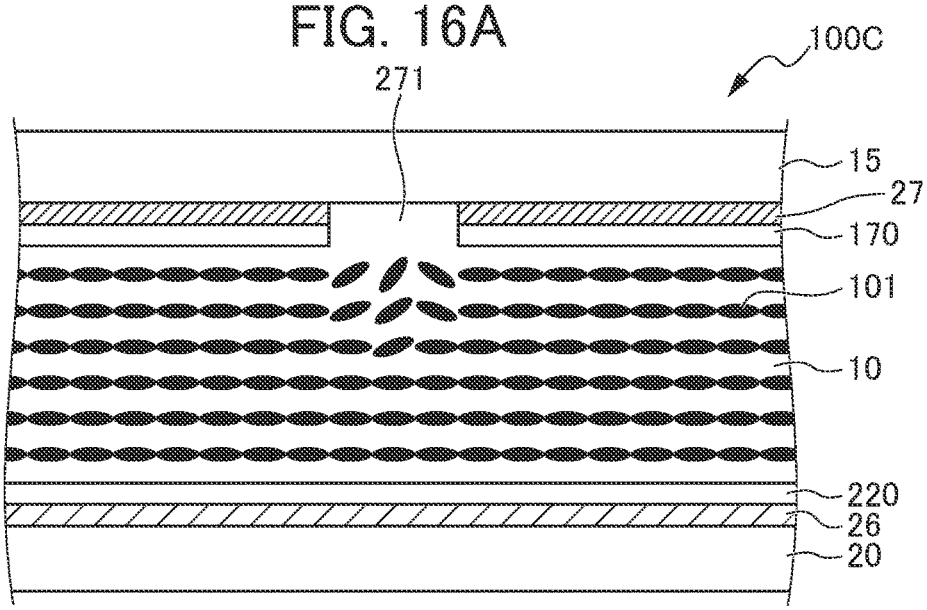
FIG. 16A
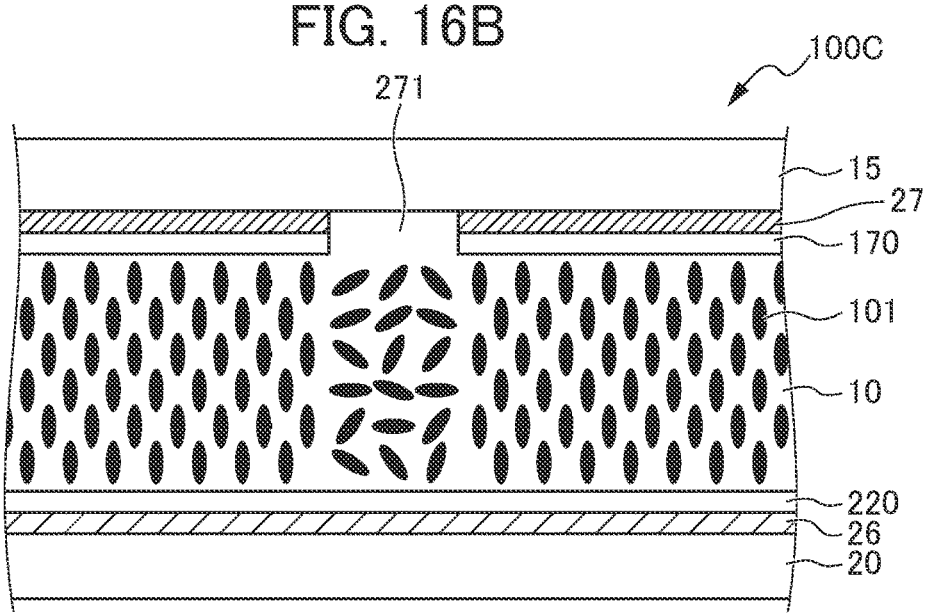
FIG. 16B
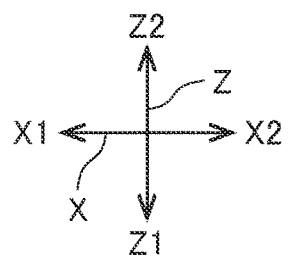

FIG. 17
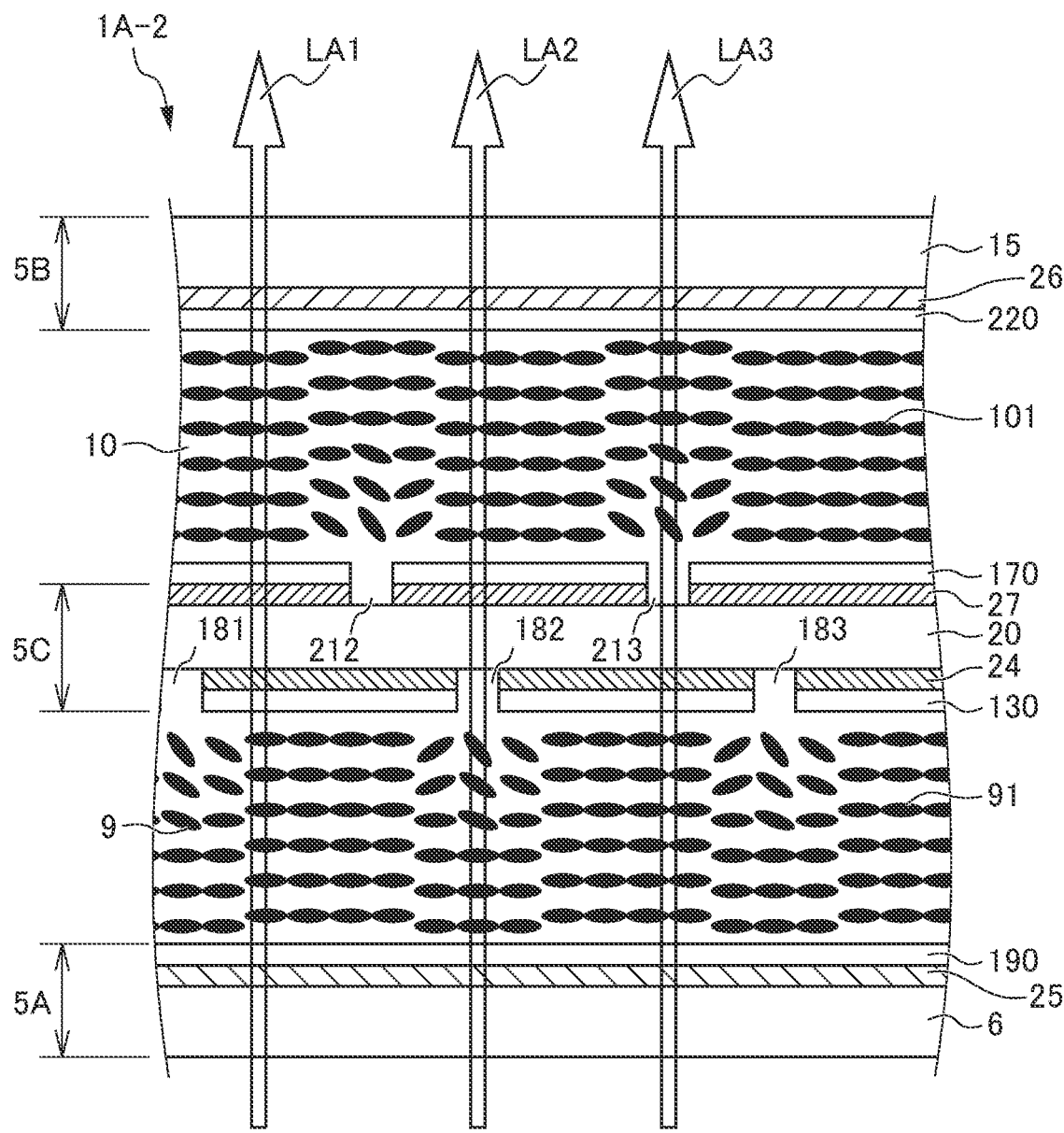
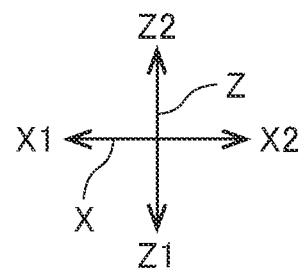

LIGHT CONTROL MEMBER AND LIGHT CONTROL DEVICE

TECHNICAL FIELD

The present disclosure relates to a light control member and a light control device.

BACKGROUND ART

Conventionally, for example, various measures related to a light control member that is pasted on a window or attached to a window by being sandwiched between glass panes, and controls transmission of light from the outside have been proposed. As such a light control member, a member that uses guest-host liquid crystals has been proposed. With the guest-host liquid crystals, the state is changed between a state in which guest-host liquid crystal compositions and dichroism pigment compositions are randomly oriented and another state in which the compositions are oriented in twist alignment, by electric field control, thus controlling the intensity of transmitted light. In a case in which the light control members are disposed on windows of a vehicle, windows of a building or the like, and the color and the viewing angle characteristics are primarily taken into account. It is desirable to apply guest-host liquid crystals in the light control member. A light control body in which transparent electrodes are divided into a plurality of areas and which changes the light control state of each of the areas in an independent manner is disclosed (Patent Document 1).

Patent Document 1: Japanese Unexamined Patent Application Publication No. 2019-128376

DISCLOSURE OF THE INVENTION

Problems to be Solved by the Invention

Unfortunately, in the case in which the transparent electrode is formed to be divided into the plurality of areas, areas (non-electrode areas) that separate and intervene between the electrodes are possibly visually identified.

The embodiments of the present disclosure have an object to provide a light control member and a light control device that have less visible non-electrode areas.

Means for Solving the Problems

The embodiments of the present disclosure achieve the aforementioned object by the following solving means. Note that descriptions will be made with assigned symbols corresponding to the embodiments of the present disclosure to facilitate understanding. However, there is no limitation thereto.

An embodiment in a first disclosure is a light control member (1A, 1B, 1C, 1D, 1E) having a controllable transmittance, including: an undivided first common electrode (14, 25, 28); divided first electrodes (18, 24, 29); a first liquid-crystal layer (9) disposed between the first common electrode (14, 25, 28) and the first electrodes (18, 24, 29); an undivided second common electrode (23, 26, 31); divided second electrodes (21, 27, 32); a second liquid-crystal layer (10) disposed between the second common electrode (23, 26, 31) and the second electrodes (21, 27, 32); first non-electrode lines (181 to 186, 241 to 244, 291 to 294) that divide the first electrodes (18, 24, 29); and second non-electrode lines (211 to 216, 271 to 274, 321 to 324) that divide the second electrodes (21, 27, 32), the first and second non-electrode lines being disposed at positions where the first and second non-electrode lines do not overlap with each other when viewed from a direction normal to the light control member (1A, 1B, 1C, 1D, 1E).

An embodiment in a second disclosure is the light control member (1A, 1B, 1C, 1D, 1E) according to the embodiment in the first disclosure further including: a first laminate (5A) that includes a first base material (6); a second laminate (5B) that includes a second base material (15); and a third laminate (5C) that includes a third base material (20), wherein the first liquid-crystal layer (9) is held between the first laminate (5A) and the third laminate (5C), the second liquid-crystal layer (10) is held between the second laminate (5B) and the third laminate (5C), the first non-electrode lines (181 to 186, 241 to 244, 291 to 294) and the second non-electrode lines (211 to 216, 271 to 274, 321 to 324) each have a width equal to or less than 50 µm, and a shortest distance between the first non-electrode lines (181 to 186, 241 to 244, 291 to 294) and the second non-electrode lines (211 to 216, 271 to 274, 321 to 324) is equal to or more than a sum of a layer thickness of the first liquid-crystal layer (9), a layer thickness of the third laminate (5C), and a layer thickness of the second liquid-crystal layer (10), when viewed in a direction in which the divided first electrodes (18, 24, 29) are arranged.

An embodiment in a third disclosure is the light control member (1A, 1B, 1C, 1D, 1E) according to the embodiment in the first disclosure or the second disclosure, wherein the first non-electrode lines (181 to 186, 241 to 244, 291 to 294) and the second non-electrode lines (211 to 216, 271 to 274, 321 to 324) each have a width equal to or less than 50 µm, and a shortest distance (S1) between the first non-electrode lines (181 to 186, 241 to 244, 291 to 294) and the second non-electrode lines (211 to 216, 271 to 274, 321 to 324) is equal to or less than ½ of a shortest interval between the first non-electrode lines (181 to 186, 241 to 244, 291 to 294), when viewed in a direction in which the divided first electrodes (18, 24, 29) are disposed.

An embodiment in a fourth disclosure is the light control member (1A, 1B, 1C, 1D, 1E) according to the embodiment in the first disclosure, wherein the first non-electrode lines (181 to 186, 241 to 244, 291 to 294) and the second non-electrode lines (211 to 216, 271 to 274, 321 to 324) do not overlap with each other when viewed from a direction forming an angle of 45° or more with the light control member (1A, 1B, 1C, 1D, 1E).

An embodiment in a fifth disclosure is the light control member (1D) according to any of the embodiment in the first disclosure to the embodiment in the fourth disclosure, wherein with respect to relationships between the first non-electrode lines (181 to 186, 241 to 244, 291 to 294) and the second non-electrode lines (211 to 216, 271 to 274, 321 to 324) that are disposed closest in a direction in which the divided first electrodes (18, 24, 29) are arranged, the light control member (1D) has two areas (A1, A2) that are disposed to have different deviations in orientation of the first non-electrode lines (181 to 186, 241 to 244, 291 to 294) with reference to the second non-electrode lines (211 to 216, 271 to 274, 321 to 324).

An embodiment in a sixth disclosure is the light control member (1E) according to any of the embodiment in the first disclosure to the embodiment in the fifth disclosure, further including: alignment layers (130) on the first electrodes, the alignment layers being divided and laminated respectively on the first electrodes (24) in accordance with division of the first electrodes (24); and alignment layers (170) on the second electrodes, the alignment layers being divided and laminated respectively on the second electrodes (27) in accordance with division of the second electrodes (27), wherein the first liquid-crystal layer (9) and the second liquid-crystal layer (10) are configured to be normally dark so as to be in a light blocking state when no electric field is applied and in a transmitting state when an electric field is applied; an alignment direction of liquid crystal molecules (91) in the first liquid-crystal layer (9) in the light blocking state and an alignment direction of liquid crystal molecules (101) in the second liquid-crystal layer (10) in the light blocking state intersect with each other, when viewed from the direction normal to the light control member (1E); and the first liquid-crystal layer (9) and the second liquid-crystal layer (10) are disposed between the first electrodes (24) and the second electrodes (27).

An embodiment in a seventh disclosure is the light control member (1E) according to the embodiment in the sixth disclosure, wherein the alignment direction of liquid crystal molecules (91) in the first liquid-crystal layer (9) in the light blocking state and the alignment direction of liquid crystal molecules (101) in the second liquid-crystal layer (10) in the light blocking state are orthogonal to each other when viewed from the direction normal to the light control member (1E).

An embodiment in an eighth disclosure is a light control device including: a first transparent plate; a second transparent plate disposed opposite to the first transparent plate; and the light control member (1A, 1B, 1C, 1D, 1E) according to any one of the embodiment in the first disclosure to the embodiment in the fifth disclosure which is provided between the first transparent plate and the second transparent plate.

Effects of the Invention

According to the embodiments of the present disclosure, a light control member and a light control device that have less visible non-electrode areas is provided.

BRIEF DESCRIPTION OF THE DRAWINGS

FIG. 1 is a sectional view showing a schematic configuration of a light control film 1A in a first embodiment;

FIG. 6A and FIG. 6B each illustrate a visual appearance of positions corresponding to non-electrode lines of a light control film 100 that includes a single liquid-crystal layer;

FIG. 7A and FIG. 7B each illustrate a visual appearance of positions corresponding to non-electrode lines of the light control film 1A in the first embodiment;

FIG. 9 is a sectional view showing a schematic configuration of a light control film 1B in a second embodiment;

FIG. 10 is a sectional view showing a schematic configuration of a light control film 1C in a third embodiment;

FIG. 13 is a sectional view showing a schematic configuration of a light control film 1E in a fifth embodiment;

FIG. 15A and FIG. 15B each illustrate an alignment of liquid crystal molecules 101 in a light control film 100B;

FIG. 16A and FIG. 16B each illustrate an alignment of liquid crystal molecules 101 in a light control film 100C;

FIG. 17 illustrates light blocking characteristics of a light control film 1A-2 where neither a first liquid-crystal layer 9 nor a second liquid-crystal layer 10 is disposed between first electrodes 24 and second electrodes 27, with no electric field (light blocking state);

PREFERRED MODE FOR CARRYING OUT THE INVENTION

Hereinafter, embodiments of the present disclosure are described. Note that all the drawings attached are schematic diagrams, conceptual diagrams and the like, in which the shapes, scales, aspect ratios of dimensions and the like of components are changed or deformed from those of actual components in consideration of ease of understanding and the like. Each term identifying a shape, a geometrical condition, and degrees of them, for example, "direction" includes not only the strict meaning of the term concerned but also a range that can be substantially regarded as the direction.

Figure 2:
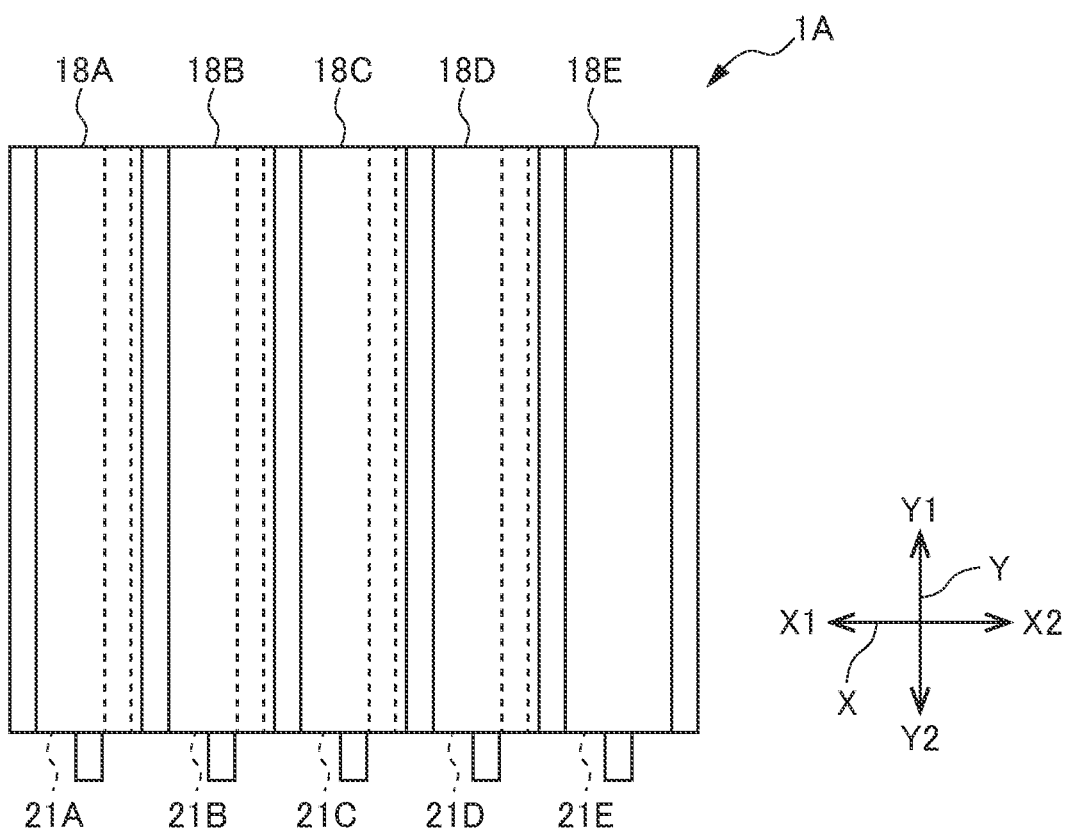
FIG. 2 is a plan view of the light control film 1A viewed from a Z1 direction.
Figure 3A:
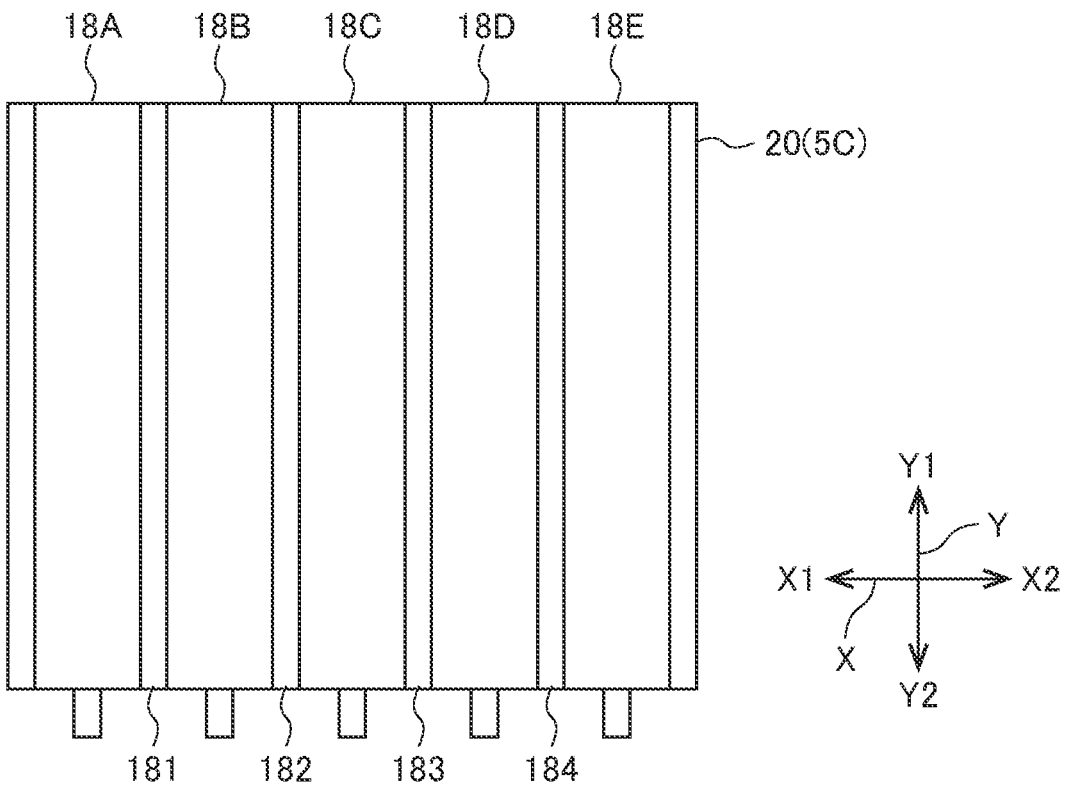
FIG. 3A and FIG. 3B illustrate the dispositions of first electrodes 18 and second electrodes 21, respectively.
Figure 3B:
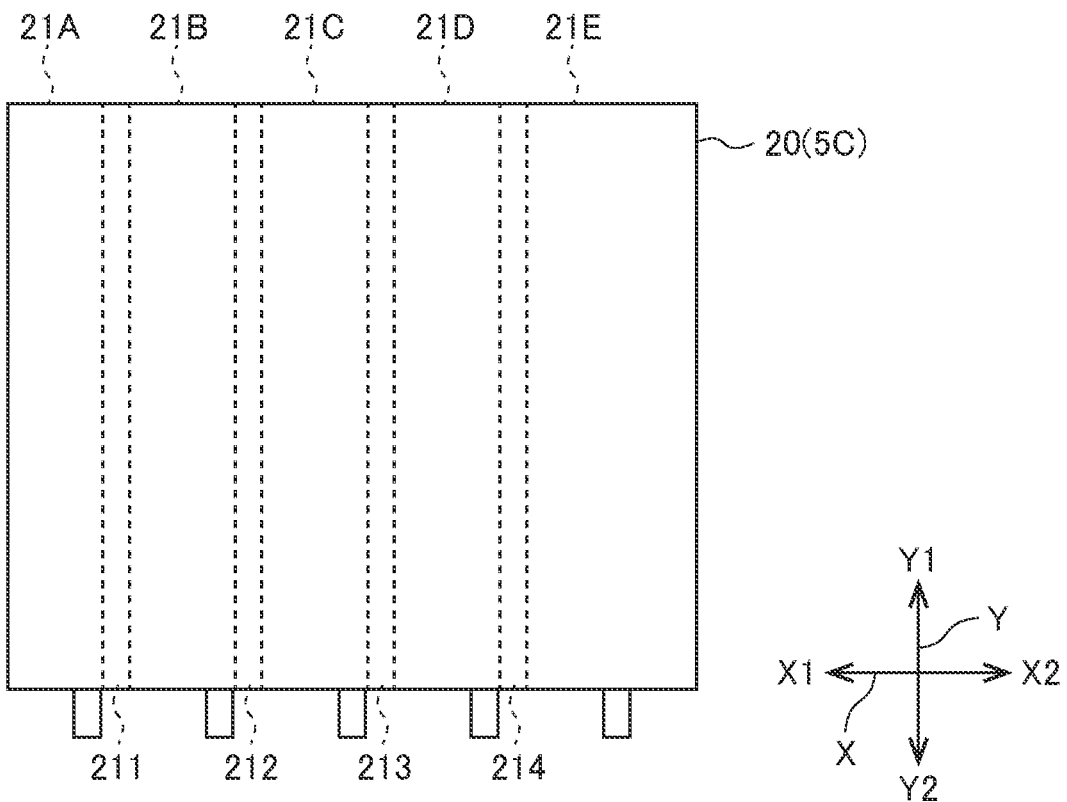

Note that the lateral direction, the vertical direction and the like of each of light control films (members) 1A are not particularly specified. However, the directions of the light control films 1A are described based on X, Y, and Z coordinate axes that are orthogonal to each other. Specifically, with reference to a state in which the light control films 1A are disposed respectively on side windows 41A to 41D (hereinafter, also simply called "side windows") of a vehicle 40 (see FIG. 4) or on an in-vehicle partition 45 two directions that are in parallel with a film surface of the light control film 1A and orthogonal to each other are assumed as an X-direction and a Y-direction. Among them, the lateral direction in FIGS. 1 to 3 is assumed as the X (X1-X2) direction. The vertical direction orthogonal to the X-direction in FIGS. 2, 3A and 3B is assumed as the Y (Y1-Y2) direction. The thickness direction orthogonal to the film surface (X-Y plane) is assumed as the Z (Z1-Z2) direction. Furthermore, descriptions are made assuming that the light control film 1A is disposed so that in a case of application to each side window of the vehicle 40 (see FIG. 4), the Z1 side in the Z-direction is on a vehicle inner side and the Z2 side is on a vehicle outer side, and in a case of application to the in-vehicle partition 45 the Z1 side in the Z-direction is on a vehicle rear seat side and the Z2 side is on a vehicle front seat side. However, the directions may be changed. In this Description, " . . . direction" may be appropriately called " . . . side" instead.

First Embodiment

FIG. 1 is a sectional view showing a schematic configuration of a light control film (member) 1A in a first embodiment. FIG. 2 is a plan view of the light control film 1A viewed from a Z1 direction. FIG. 3A and FIG. 3B illustrate the dispositions of first electrodes 18 and second electrodes 21, respectively. FIG. 3A is a plan view of a third laminate 5C viewed from the Z1 direction for illustrating the disposition of the first electrodes 18. FIG. 3B illustrates the disposition of the second electrodes 21, and corresponds to a plan view of the third laminate 5C viewed from the Z1 direction, but the first electrodes 18 are omitted.

Figure 4:
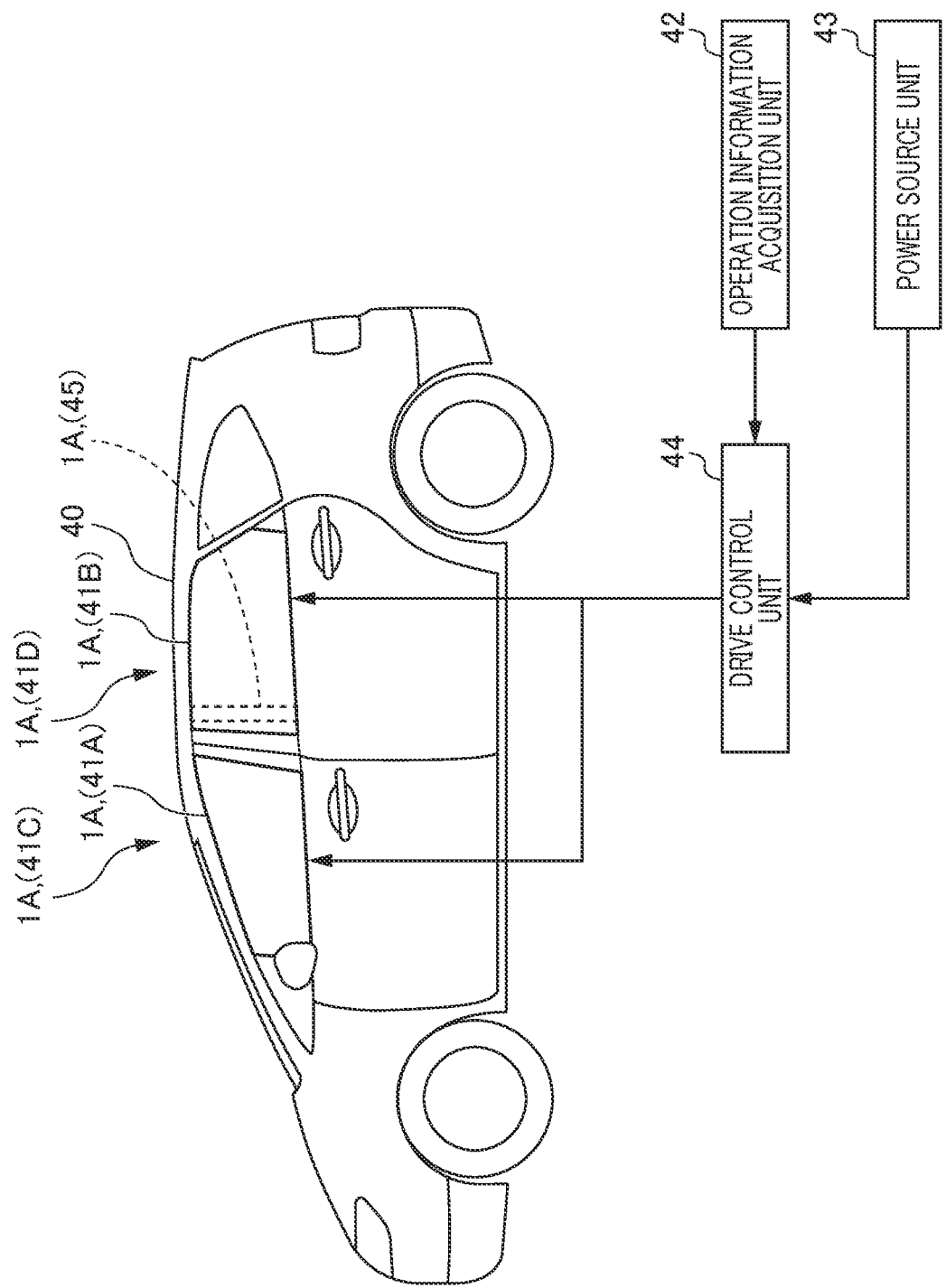
FIG. 4 illustrates a vehicle 40 where light control films 1A are disposed, and a drive device for the light control films 1A.

Note that in a case in which the light control film 1A is disposed in the vehicle 40 the light control film 1A is fabricated in conformity with the shape of each of the side windows 41A to 41D (see FIG. 4). Consequently, in the case of applying each light control film 1A to the vehicle 40 the film has a curved shape instead of a flat shape in a sectional view, and may have any of various shapes in a plan view. However, for the sake of easy understanding of the shapes of electrode patterns and the like, an example where the light control film 1A has a rectangular shape (square) is described. Note that the plan view is for example, a case of viewing the light control film 1A from the Z1 direction (the direction normal to the light control film 1A). In FIGS. 2, 3A and 3B, illustration of the liquid-crystal layers and alignment films is omitted.

The light control film 1A is a film-shaped light control member that controls the alignment of liquid crystal molecules in each of a first liquid-crystal layer 9 and a second liquid-crystal layer 10 by a voltage applied to after-mentioned first electrodes 18 and second electrodes 21, and adjust the transmittance of light. As shown in FIG. 1, the light control film 1A includes a first laminate 5A, a second laminate 5B, a third laminate 5C, the first liquid-crystal layer 9, and the second liquid-crystal layer 10.

In the first laminate 5A, a first common electrode 14 is laminated on the Z2 side of a first base material 6, and an alignment layer 13 is laminated further thereon (Z2 side).

In the second laminate 5B, a second common electrode 23 is laminated on the Z1 side of a second base material 15, and an alignment layer 17 is laminated further thereon (Z1 side).

The third laminate 5C is a laminate disposed between the first laminate 5A and the second laminate 5B. In the third laminate 5C, the first electrodes 18 and an alignment layer 19 are laminated on the Z1 side of a third base material 20 and the second electrodes 21 and an alignment layer 22 are laminated further on the Z2 side of the third base material 20.

All of the first base material 6, the second base material 15, and the third base material 20 may be made of similar materials. Although various transparent resin films may be used as the first base material 6, the second base material 15, and the third base material 20 it is desirable to use a transparent resin film that has a small optical anisotropy, and a transmittance at visible-range wavelengths (380 to 800 nm) equal to or more than 80%. The materials of the transparent resin films may include, for example; acetyl cellulose resins, such as triacetyl cellulose (TAC); polyester resins, such as polyethylene terephthalate (PET), and polyethylene naphthalate (PEN); polyolefin resins, such as polyethylene (PE), polypropylene (PP), polystyrene, polymethylpentene, and EVA; vinyl resins, such as polyvinyl chloride, and polyvinylidene chloride; acrylic resins; polyurethane resins; and resins, such as polysulfone (PSU), polyethersulfone (PES), polycarbonate (PC), polysulfone, polyether (PE), polyetherketone (PEK), (meth)acrylonitrile, cycloolefin polymer (COP), and cycloolefin copolymer. In particular, resins, such as polycarbonate (PC), cycloolefin polymer (COP), and polyethylene terephthalate (PET) may be preferable. In this embodiment, for example, polyethylene terephthalate (PET) having a thickness of 125 µm is applied as each of the first base material 6, the second base material 15, and the third base material 20. Alternatively, any of transparent resin films having various thicknesses may be applicable.

The first common electrode 14, the second common electrode 23, the first electrodes 18, and the second electrodes 21 are transparent conductive films. Various types of transparent electrode materials applied as such types of transparent resin films may be applicable as the transparent resin films. For example, the film may be an oxide-based metal thin film having an all light transmittance of 50% or more. For example, the film may be any of tin oxide based, indium oxide based, and zinc oxide based films.

Tin oxide ($SnO_2$) based films may include NESA (tin oxide $SnO_2$), ATO (antimony tin oxide: antimony-doped tin oxide), and fluorine-doped tin oxide. Indium oxide ($In_2O_3$) based films may include indium oxide, and ITO (indium tin oxide), and IZO (indium zinc oxide). Zinc oxide (ZnO) based films may include zinc oxide, AZO (aluminum-doped zinc oxide), and gallium-doped zinc oxide.

In this embodiment, an example is described where with respect to all of the first common electrode 14, the second common electrode 23, the first electrodes 18, and the second electrodes 21, the transparent conductive films are made of ITO (indium tin oxide). The first electrodes 18 and the second electrodes 21 are multiple divided electrodes, which are described later.

All of the alignment layer 13, the alignment layer 17, the alignment layer 19, and the alignment layer 22 are formed of optical alignment layers. Various materials to which an optical alignment method is applicable may be widely applied as optical alignment materials applicable as the optical alignment layers. For example, the materials may include a photolytic type, a photodimerization type, and a photoisomerization type. In this embodiment, a photodimerization type material is used. The photodimerization type materials may be, for example, cinnamate, coumarin, benzylidene phthalimidine, benzylidene acetophenone, diphenylacetylene, stilbazole, uracil, quinolinone, maleinimide, or a polymer containing a cinnamylidene acetic acid derivative. Among them, a polymer containing one or both of cinnamate, and coumarin may be preferably used, because the alignment regulating force is favorable. Specific examples of such a photodimerization type material may include compounds described in, for example, Japanese Unexamined Patent Application, Publication No. H9-118717, Japanese Unexamined Patent Application, Publication No. H10-506420, Japanese Unexamined Patent Application, Publication No. 2003-505561, and WO2010/150748. Note that instead of the optical alignment layer, an alignment layer may be fabricated by a rubbing process, or an alignment layer may be fabricated by applying a forming process and making a fine line convexo-concave shape.

The first liquid-crystal layer 9 is held between the first laminate 5A and the third laminate 5C. The second liquid-crystal layer 10 is held between the second laminate 5B and the third laminate 5C. For example, a guest-host liquid crystal composition, and a dichroism pigment composition may be applied as the first liquid-crystal layer 9, and the second liquid-crystal layer 10. By causing a guest-host liquid crystal composition to contain a chiral agent, the liquid crystal molecules may be oriented to have helical shapes in the thickness direction of the liquid-crystal layer (Z-direction) when the molecules are horizontally aligned.

The light control film 1A includes a vertical alignment layer where the alignment regulating forces of the alignment layers 13, 19, 17, and 22 are configured so that the state is in a light blocking state due to the alignment of the guest-host liquid crystal composition when an electric field is applied. Thus, the light control film 1A is configured as a normally clear one. The normally clear structure indicates a structure that is in a transmitting state when no electric field is applied and in a light blocking state when an electric field is applied. Note that a normally dark configuration may be adopted in order to achieve the transmitting state when an electric field is applied. The normally dark structure indicates a structure that is in the light blocking state when no electric field is applied and in the transmitting state when an electric field is applied. In this embodiment, the example is described where the guest-host liquid crystal compositions are applied as the first liquid-crystal layer 9 and the second liquid-crystal layer 10. Alternatively, another liquid crystal composition may be applied only if the composition controls the transmitting state and the light blocking state depending on presence or absence of electric field application.

Spacers 12 are members provided in order to control the thicknesses of the first liquid-crystal layer 9 and the second liquid-crystal layer 10. Various resin materials may be widely applied as the spacers 12. Accordingly, in this embodiment, the example of using spherical spacers (hereinafter, also called "bead spacers") as the spacers 12 is described. Alternatively, the spacers 12 may be, for example, columnar spacers.

Publicly known beads used as liquid crystal display devices, color filters and the like may be applicable as bead spacers for the spacers 12. Specifically, granular bodies having spherical, columnar, and cylindrical shapes, porous bodies, hollow bodies and the like may be used: inorganic components may be glass, silica, and metal oxides (MgO, $Al_2O_3$), and organic components may be obtained by a polymerization method, such as suspension polymerization, emulsion polymerization, or a seed polymerization method using core particles obtained by emulsion polymerization applied to materials, such as acrylic resins, epoxy resins, phenol resin, melamine resin, unsaturated polyester resin, divinylbenzene copolymer, divinylbenzene-acrylate copolymer, diallyl phthalate copolymer, or allyl isocyanurate copolymer.

In view of improving the dispersibility and adhesiveness of beads on the alignment layer, a surface treatment may be applied to the surfaces of bead spacers. The surface cover material is not specifically limited only if it does not induce any problem related to fixation to the bead surfaces or flowing of chemical substances into a liquid crystal material, for example. However, for example, polyethylene, ethylene-vinyl acetate copolymer, ethylene-acrylic acid ester copolymer, polymethyl (meth)acrylate copolymer, SBS type styrene-butadiene block copolymer, epoxy resin, phenol resin, melamine resin and the like may be used.

The light control film 1A is provided with seal material 7 disposed to form frame shapes respectively surrounding the first liquid-crystal layer 9 and the second liquid-crystal layer 10 in plan view. The first laminate 5A and the third laminate 5C are integrally held by the seal material 7, which prevents the liquid crystal material from leaking. Likewise, the second laminate 5B and the third laminate 5C are integrally held by the seal material 7, which prevents the liquid crystal material from leaking. For example, a thermosetting resin, such as epoxy resin or acrylic resin, or an ultraviolet curable resin may be applied as the seal material 7.

In the light control film 1A, a rectangular AC voltage having polarity changing with a predetermined period is applied to the first electrodes 18 and the second electrodes 21. By the AC voltage, an electric field is formed at the first liquid-crystal layer 9 and the second liquid-crystal layer 10. By the electric field, the alignments of liquid crystal provided in the first liquid-crystal layer 9 and the second liquid-crystal layer 10 are controlled, so that transmitted light is controlled.

FIG. 4 illustrates a vehicle 40 where light control films 1A are disposed and a drive device for the light control films 1A. FIG. 4 shows the entire vehicle viewed from a side. The light control films 1A in this embodiment are disposed on the substantially entire surfaces of a front seat side window 41A, a rear seat side window 41B, a front seat side window 41C, and a rear seat side window 41D of the vehicle (means of transport) 40. Note that for the front seat side window 41C and the rear seat side window 41D, only their positions are indicated by arrows. Since the light control films 1A in this embodiment have flexibility, the films can be disposed on side windows and the like having curved shapes. The light control film 1A is also disposed on an in-vehicle partition 45 disposed between vehicle front seats and vehicle rear seats.

The light control films 1A are configured to respectively supply power for separately driving the side windows 41A to 41D and the in-vehicle partition 45. Accordingly, the transmittances of the side windows 41A to 41D and the in-vehicle partition 45 are separately controlled. That is by disposing the light control films 1A on the side windows 41A to 41D and the in-vehicle partition 45 external light is transmitted and enters the inside of the vehicle, external light that is to enter the inside of the vehicle is blocked, and the visibility between the vehicle front seats and the vehicle rear seats is regulated as required at the side windows 41A to 41D and the in-vehicle partition 45.

The vehicle 40 includes an operation information acquisition unit 42, a power source unit 43, and a drive control unit 44 as a drive device for the light control films 1A disposed on each of the side windows 41A to 41D and the in-vehicle partition 45 described above. The operation information acquisition unit 42 is a device operated not only by a driver but also by passengers seated in a passenger seat, rear seats and the like (hereinafter also called "driver etc.") when adjusting the light intensity of external light entering from the side windows 41A to 41D, and is made up of a touch panel, for example. The driver etc. simultaneously or separately adjusts the light intensity of external light entering through the side windows 41A to 41D by operating the touch panel provided at each of door sides etc. Likewise, the driver etc. adjusts light transmission and blocking of light at the in-vehicle partition 45 by operating the touch panel provided at each of the door sides etc. The power source unit 43 is a power source device that supplies power to the drive control unit 44.

The drive control unit 44 is a device that controls the transmittance of each light control film 1A by controlling the AC voltage applied to the light control film 1A through the power supplied from the power source unit 43. Accordingly, external light is blocked at each of the side windows 41A to 41D and the in-vehicle partition 45 so that the inside of the vehicle is less visible; external light is transmitted, so that the outside of the vehicle is made easily visible from the inside of the vehicle; or the visibility between the vehicle front seats and the vehicle rear seats is regulated.

Although not shown, the drive control unit 44 includes: a drive circuit that applies the rectangular AC voltage to the first electrodes 18 and the second electrodes 21 of the light control film 1A; and a processor unit that controls the operation of the drive circuit. The processor unit is a control device that includes a processor (CPU), a ROM, and a RAM. In the processor unit, the processor controls the operation of the drive circuit described above by reading and executing a control program for the light control film 1A stored in the ROM.

Returning to FIGS. 3A and 3B from FIG. 1, the first electrodes 18 and the second electrodes 21 are pluralities of divided electrodes. In the example shown in FIGS. 1 to 3A and 3B, the first electrodes 18 are configured as the plurality of divided partial electrodes 18A to 18E that are electrically insulated from each other. The first electrodes 18 are divided along the X-direction and formed to have a striped electrode pattern extending along the Y-direction. The second electrodes 21 are configured as the plurality of divided partial electrodes 21A to 21E that are electrically insulated from each other. Similar to the first electrodes 18, the second electrodes 21 are divided along the X-direction and formed to have a striped electrode pattern extending along the Y-direction. In the light control film 1A in the first embodiment, the partial electrodes 18A to 18E and the partial electrodes 21A to 21E are formed on the respective sides of the single third laminate 5C. Consequently, positioning between the partial electrodes 18A to 18E and the partial electrodes 21A to 21E when the light control film 1A is assembled is not required, and relative positional accuracy between both is improved. Note that in this embodiment, for convenience of description, an example where the first electrodes 18 and the second electrodes 21 are each five divided electrodes is described. However, each of the numbers of divided electrodes of the first electrodes 18 and the second electrodes 21 is not limited to five.

As described above, the first electrodes 18 and the second electrodes 21 in this embodiment are the pluralities of divided partial electrodes. Such partial electrodes may be formed by, for example, forming transparent conductive films entirely on the surfaces of the base material, and subsequently patterning the transparent conductive film according to the respective electrode patterns. In this case, the alignment layers 19 and 22 are formed on the entire surfaces of the patterned transparent conductive films. Alternatively, the layers may be formed entirely on the surfaces of the base material in the order of the transparent conductive films and the alignment layers, and subsequently, the transparent conductive films on unnecessary portions, together with the alignment layers, may be patterned.

As the first electrodes 18 and the second electrodes 21 are configured as the pluralities of divided partial electrodes, the same control is applied to both the partial electrodes at the opposite positions when turning to the transmitting state or the light blocking state. For example, when the position of the partial electrode 18A is brought into the transmitting state, not only the position of the partial electrode 18A but also the position of the partial electrode 21A are brought into the transmitting state. Likewise, when the position of the partial electrode 18E is brought into the light blocking state, not only the position of the partial electrode 18E but also the position of the partial electrode 21E are brought into the light blocking state.

The first electrodes 18 and the second electrodes 21 are configured as the pluralities of divided electrodes as described above. Between the divided partial electrodes 18A to 18E and between the divided partial electrodes 21A to 21E, there are gap portions (non-electrode areas) where no electrode (transparent conductive film) is formed. In the example shown in FIG. 3A and FIG. 3B, first non-electrode lines 181 to 184 that divide the first electrodes 18 are provided as non-electrode areas between the partial electrodes 18A to 18E. Furthermore, second non-electrode lines 211 to 214 that divide the second electrodes 21 are provided as non-electrode areas between the partial electrodes 21A to 21E.

It is desirable that the width G1 between the first non-electrode lines 181 to 184 and the width G2 between the second non-electrode lines 211 to 214 be 5 μm or more in order to prevent the adjacent partial electrodes from being short-circuited. It is desirable that the width G1 between the first non-electrode lines 181 to 184 and the width G2 between the second non-electrode lines 211 to 214 be 50 μm or less in order to make the first non-electrode lines 181 to 184 and the second non-electrode lines 211 to 214 less visible. The reason is described later. In this embodiment, G1=G2=10 μm, for example. The first non-electrode lines 181 to 184 and the second non-electrode lines 211 to 214 are disposed at positions that do not overlap each other when viewed from the direction normal to the light control film 1A. Specifically, the first non-electrode line 181 in FIG. 1 is disposed to deviate in the X2 direction from the second non-electrode line 211. For example, it is so disposed that the shortest distance S1 between the first non-electrode line 184 and the second non-electrode line 214 is 1 mm in the direction in which the divided first electrodes 18 are arranged. Likewise, the other first non-electrode lines 182 to 184 and the second non-electrode lines 212 to 214 are disposed in such a deviating manner. As described above, the first non-electrode lines 181 to 184 and the second non-electrode lines 211 to 214 is 50 μm or less. Accordingly, the first non-electrode lines 181 to 184 and the second non-electrode lines 211 to 214 are thus disposed so as not to overlap each other when viewed from the direction normal to the light control film 1A. The reason will be described later.

Figure 5:
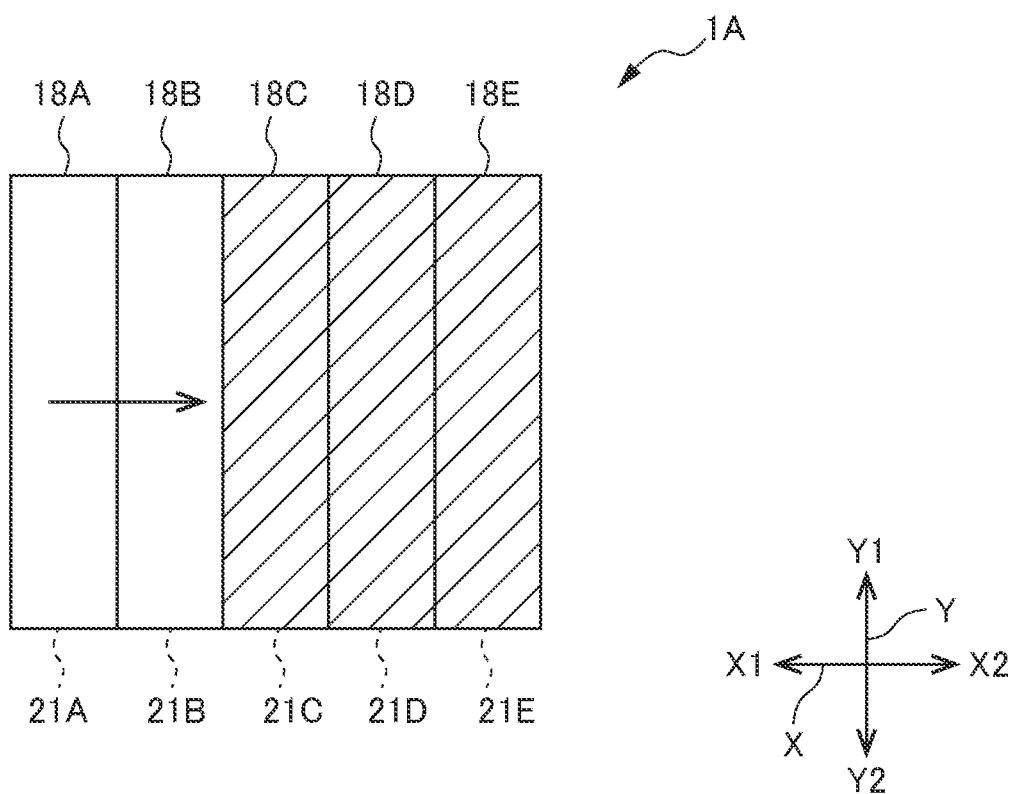
FIG. 5 illustrates an example of usage of the light control film 1A.

Next, an example of using the light control film 1A configured as described above is described. FIG. 5 illustrates an example of using the light control film 1A. As described above, the light control film 1A disposed in the vehicle 40 is fabricated in conformity with the shape of each window. In FIG. 5, for the sake of easy understanding, an example where the light control film 1A has a rectangular shape is described. In FIG. 5, a portion of "hatched lines" indicates a portion where external light is blocked at the light control film 1A. A "white" portion indicates a portion through which external light passes in the light control film 1A. FIG. 5 schematically shows areas where light is blocked or transmitted by the partial electrodes. With the example shown in FIG. 5, a state in which light blocking and transmission at the light control film 1A is changed in the lateral direction is exemplified.

The light control film 1A separately controls the transmittances of areas corresponding to the partial electrodes 18A to 18E of the first laminate 5A, and separately controls the transmittances of areas corresponding to the partial electrodes 21A to 21E of the second laminate 5B. For example, to sequentially bring the light control film 1A into the transmitting state from the X1 side to the X2 side when the entire surface of the light control film 1A is in the light blocking state, energization is controlled sequentially from the partial electrodes 18A and 21A on the most X1 side to the partial electrodes 18E and 21E on the most X2 side among the partial electrodes 18A to 18E and the partial electrodes 21A to 21E of the third laminate 5C. Accordingly, as shown in FIG. 5, the light control film 1A is brought into the transmitting state sequentially from the X1 side to the X2 side in the lateral direction. FIG. 5 shows a situation where the areas corresponding to the partial electrodes 18A, 18B, 21A, and 21B in the light control film 1A are changed from the light blocking state to the transmitting state.

For example, to sequentially bring the light control film 1A into the transmitting state from the X2 side to the X1 side when the entire surface of the light control film 1A is in the light blocking state, energization is controlled sequentially from the partial electrodes 18E and 21E on the most X2 side to the partial electrodes 18A and 21A on the most X1 side among the partial electrodes 18A to 18E and the partial electrodes 21A to 21E of the third laminate 5C. As for the example described above, the example of change from the light blocking state to the transmitting state is exemplified. Change from the transmitting state to the light blocking state is continuously performed in the lateral direction in a similar manner.

As described above, by dividing and disposing the electrodes, control of external light blocking and transmission in the lateral direction as curtain opening and closing is achieved at the light control film 1A. Accordingly, for example, when a person in the vehicle wants to view only part of external scenery, the external light is transmitted through a required range by changing the light blocking state and the transmitting state of the light control film 1A sequentially along the lateral direction as described above. If the orientation of the disposition of the light control film 1A is rotated by 90° on the X-Y plane, the transmittance is controlled in the vertical direction on an area-by-area basis.

If the configuration where the electrodes are divided and disposed is adopted, control of the transmitting state and the light blocking state on the area-by-area basis as described above is achieved even only with a single liquid-crystal layer. However, the case of a single liquid-crystal layer has a problem that the non-electrode lines residing between the divided electrodes are visually identified. Accordingly, the light control film 1A in this embodiment is provided with the two liquid-crystal layers, thus achieving the configuration where the non-electrode lines are not visually identified. Hereinafter, this point will be described.

First, a phenomenon that non-electrode lines are visually identified on a single liquid-crystal layer is described. FIG. 6A and FIG. 6B each illustrate a visual appearance of positions corresponding to non-electrode lines of a light control film 100 that includes a single liquid-crystal layer and is a comparative example. FIG. 6A shows a section similar to that in FIG. 1. FIG. 6B shows a state in FIG. 6A viewed from the Z1 side. In FIGS. 6A and 6B, an area in the transmitting state is shown in white, an area in the light blocking state is shown in black, and a portion having a medial transmittance between an electric-field-applied state and a no-electric-field-applied state are filled with dots. This also applies similarly to each diagram shown later. Note that in FIG. 6A, the light transmission and blocking states with respect to the positions of the first liquid-crystal layer 9 are additionally described, and spacers are omitted. The light control film 100 in the comparative example shown in FIG. 6A and FIG. 6B corresponds to an embodiment that has the components including only from the first base material 6 to the third base material 20 in the light control film 1A in the first embodiment, and includes the single liquid-crystal layer (only the first liquid-crystal layer 9). Also in this case, similar to the light control film 1A in the first embodiment, the transmitting state and the light blocking state are freely switched with respect to the position. Similar to FIG. 5 described above, the examples in FIG. 6A and FIG. 6B show that parts of the first liquid-crystal layer 9 opposite to two partial electrodes 18A and 18B on the X1 side are in the transmitting state and parts of the first liquid-crystal layer 9 opposite to three partial electrodes 18C, 18D, and 18E on the X2 side are in the light blocking state.

In proximity to the area in the state with no electric field, the alignment of liquid crystal molecules is controlled by the alignment layers 13 and 19 also at the positions corresponding to the first non-electrode lines 181 to 184. Accordingly, similar to the positions corresponding to the partial electrodes 18A to 18E, the liquid crystal molecules are aligned. However, in proximity to the area in the electric-field-applied state, the positions corresponding to the first non-electrode lines 181 to 184 are affected by the electric field of the partial electrodes 18A to 18E to some extent, but a sufficient electric field is not supplied, and the alignment of liquid crystal molecules is not appropriately controlled. Consequently, in proximity to the area in the electric-field-applied state, the alignment of liquid crystal molecules is in a disturbed state at the positions corresponding to the first non-electrode lines 181 to 184, and the transmittance of light becomes a transmittance between that in the area in the electric-field-applied state and that in the area in the no-electric-field-applied state (hereinafter also referred to "a semi-transmissive state").

In FIG. 6B, it is desirable that the areas in the light blocking state (the areas corresponding to the partial electrodes 18C, 18D, and 18E, and areas between them) be in the light blocking state over the entire areas. However, it may not be possible to control the alignment of liquid crystal molecules in the first liquid-crystal layer 9 residing in the areas that do not face the partial electrodes 18C, 18D, and 18E, that is the area facing the first non-electrode line 183 between the partial electrodes 18C and 18D, and the area facing the first non-electrode line 184 between the partial electrodes 18D and 18E. The first liquid-crystal layer 9 exemplified in FIG. 6A, which is normally clear liquid crystal, is in the transmitting state when no electric field is applied and in the light blocking state when an electrical field is applied. Consequently, in proximity to the areas in the light blocking state, the positions corresponding to the first non-electrode lines 181 to 184 are in the semi-transmissive state. Therefore, as shown in FIG. 6B, long and narrow areas in the semi-transmissive state corresponding to the first non-electrode lines 183 and 184 are visually identified in the areas in the light blocking state which are desirable to be in the light blocking state over the entire areas.

Next, the case of the light control film 1A in this embodiment is described. FIG. 7A and FIG. 7B each illustrate a visual appearance of positions corresponding to non-electrode lines of the light control film 1A in the first embodiment. FIG. 7A shows a section similar to that in FIG. 1. FIG. 7B shows the state in FIG. 7A when viewed from the Z1 side. Note that in FIG. 7A, the light transmission and blocking states with respect to the positions of the first liquid-crystal layer 9 and the second liquid-crystal layer 10 are additionally described, and spacers are omitted.

In the example shown in FIG. 7A and FIG. 7B, the partial electrodes 18A, 18B, 21A, and 21B are brought into the state with no electric field, which brings the first liquid-crystal layer 9 and the second liquid-crystal layer 10 corresponding to these positions in the transmitting state. The partial electrodes 18C, 18D, 18E, 21C, 21D, and 21E are brought into the electric-field-applied state, which brings the first liquid-crystal layer 9 and the second liquid-crystal layer 10 corresponding to these positions into the light blocking state.

Also with the configuration in this embodiment shown in FIG. 7A and FIG. 7B, the positions corresponding to the first non-electrode lines 181 to 184 and the second non-electrode lines 211 to 214 are in the transmitting state in proximity to the areas in the state with no electric field, but are in the semi-transmissive state in proximity to the areas in the electric-field-applied state. Here, the first non-electrode lines 181 to 184 and the second non-electrode lines 211 to 214 are disposed so as not to overlap each other when viewed from the direction normal to the light control film 1A. That is, the first non-electrode lines 181 to 184 overlap any of the partial electrodes 21A to 21E when viewed from the direction normal to the light control film 1A. Likewise, the second non-electrode lines 211 to 214 overlap any of the partial electrodes 18A to 18E when viewed from the direction normal to the light control film 1A. Consequently, in the areas in the light blocking state, positions corresponding to first non-electrode lines 181 to 184 or the second non-electrode lines 211 to 214 overlap with opposite liquid-crystal layers in the light blocking state, which reduces the transmittance and makes the first non-electrode lines 181 to 184 and the second non-electrode lines 211 to 214 less prominent. Accordingly, a state with a degree of transmittance that is substantially indistinguishable from that in the light blocking state is achieved. In the example in FIG. 7B, the first non-electrode lines 182, 183, and 184 respectively overlap the partial electrodes 21C, 21D, and 21E in the normal direction. Accordingly, the first non-electrode lines 182, 183, and 184, and the light blocking areas of the second liquid-crystal layer 10 are observed in an overlapping manner. Therefore, the first non-electrode lines 182, 183, and 184 are in the state with a degree of transmittance that is substantially indistinguishable from that in the light blocking state. Likewise, the second non-electrode lines 213 and 214 respectively overlap the partial electrodes 18C and 18D in the normal direction. Accordingly, the second non-electrode lines 213 and 214, and the light blocking areas of the first liquid-crystal layer 9 are observed in an overlapping manner, and the state with a degree of transmittance that is substantially indistinguishable from the light blocking state is achieved.

As previously described, it is desirable that the width G1 between the first non-electrode lines 181 to 184 and the width G2 between the second non-electrode lines 211 to 214 be 50 μm or less in order to make the first non-electrode lines 181 to 184 and the second non-electrode lines 211 to 214 less visible. If the widths G1 and G2 are each larger than 50 μm, further insusceptibility to the effect from the adjacent first electrodes 18 or the second electrodes 21 is achieved in the electric-field-applied state. In this case, at the portions corresponding to the first non-electrode lines 181 to 184 and the second non-electrode lines 211 to 214, the alignment of liquid crystals becomes close to that in the state with no electric field even in proximity to the areas in the electric-field-applied state. Accordingly, the first non-electrode lines 181 to 184 and the second non-electrode lines 211 to 214 become visually identifiable. Consequently, it is desirable that the width G1 between the first non-electrode lines 181 to 184 and the width G2 between the second non-electrode lines 211 to 214 be 50 μm or less.

Figure 8:
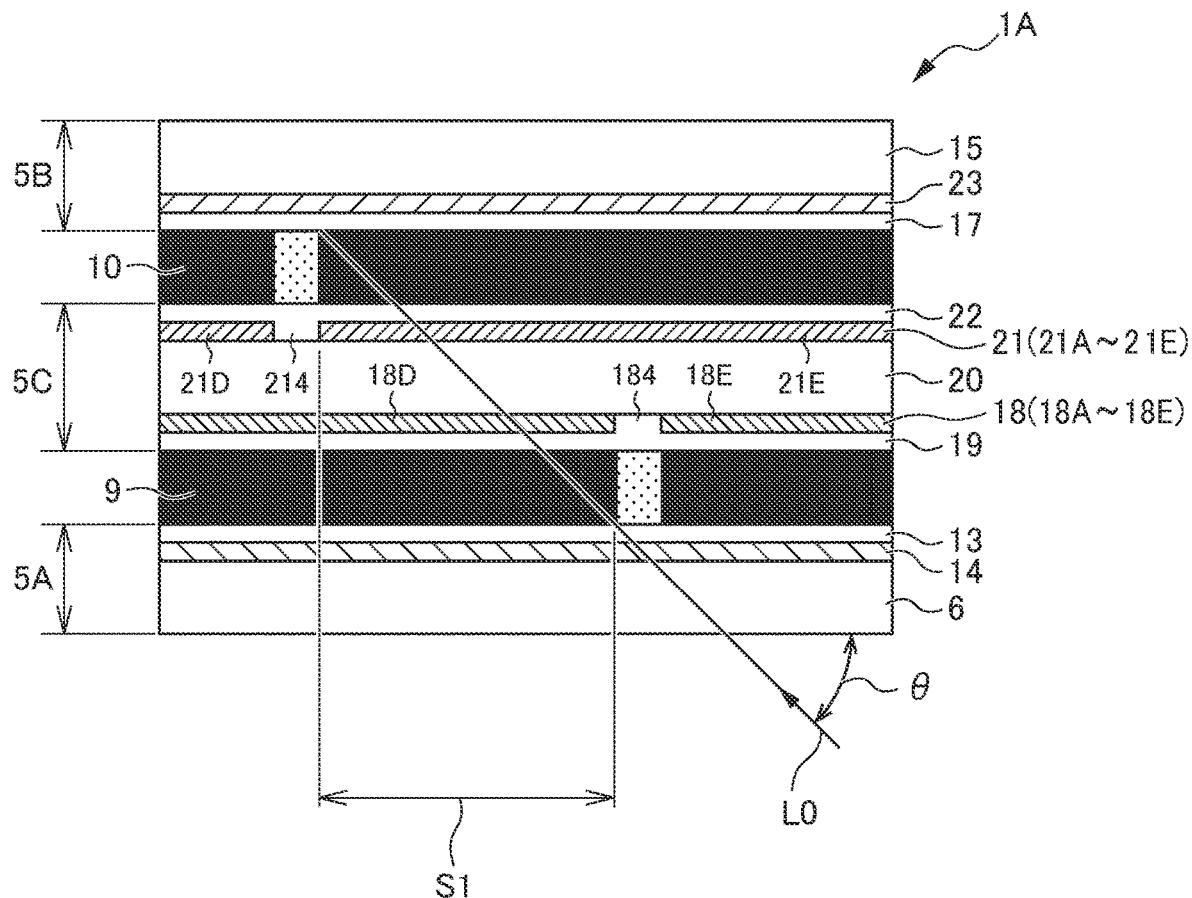
FIG. 8 is an enlarged sectional view of the vicinity of first non-electrode line 184 and the second non-electrode line 214.

In this embodiment, the example of the disposition where the shortest distance S1 between the first non-electrode lines 182 to 184 and the second non-electrode lines 212 to 214 is 1 mm has been described. An appropriate value of the shortest distance S1 will be described. FIG. 8 is an enlarged sectional view of the vicinity of the first non-electrode line 184 and the second non-electrode line 214. For example, as shown in FIG. 8, in a situation where areas around the first non-electrode line 184 and the second non-electrode line 214 are entirely in the light blocking state, a line of sight L0 is set, which passes through the areas of the first liquid-crystal layer 9 and the second liquid-crystal layer 10 in the light blocking state. The line of sight L0 passes through a corner portion of the liquid-crystal layer 9 on the Z1 side corresponding to the X1 side end of the first non-electrode line 184 and a corner portion of the liquid-crystal layer 10 on the Z2 side corresponding to the X2 side end of the second non-electrode line 214. When viewed at an angle θ smaller than that of the line of sight L0, there is a line of sight that passes twice through each area in the semi-transmissive state (area indicated with dots in FIG. 8) at any of the positions of the first non-electrode line 184 and the second non-electrode line 214. Therefore, if the angle θ is set as the minimum angle for observation of the light control film 1A, possible observation at the angle θ or more eliminates any line of sight passing twice any area in the semi-transmissive state, so that the areas corresponding to the first non-electrode line 184 and the second non-electrode line 214 are less prominent.

Here, provided that the layer thickness of the first liquid-crystal layer 9 is t1, the layer thickness of the second liquid-crystal layer 10 is t2, the layer thickness of the third laminate 5C is t3, and the angle of the line of sight L0 with the light control film 1A is θ, the relationship between these values and the shortest distance S1 between the first non-electrode lines 181 to 184 and the second non-electrode lines 211 to 214 in the direction where the divided first electrodes 18A to 18E are arranged are represented as follows.

$$\tan\theta = (t1+t2+t3)/S1 \quad \text{Expression (1)}$$

Accordingly, the shortest distance S1 can be represented as follows.

$$S1 = (t1+t2+t3)/\tan\theta \quad \text{Expression (2)}$$

Therefore, when the angle between the direction of observing the light control film 1A and the light control film 1A is θ or more, the areas corresponding to the first non-electrode line 184 and the second non-electrode line 214 are less prominent if Expression (3) is satisfied:

$$S1 \geq (t1+t2+t3)/\tan\theta \quad \text{Expression (3)}$$

When the light control film 1A is assumed to dispose on the in-vehicle partition 45 visual observation is made at an angle θ of 45° or more in most cases. It is therefore desirable that in the light control film 1A, the first non-electrode lines 181 to 184 and the second non-electrode lines 211 to 214 do not overlap with each other when viewed at an angle of 45° or more with respect to the light control film 1A. To achieve the light control film 1A where the first non-electrode lines 181 to 184 and the second non-electrode lines 211 to 214 do not overlap with each other when viewed from the direction with an angle of 45° or more with respect to the light control film 1A, it is preferable to satisfy the following relationship by setting θ=45° in the Expression (3) described above.

$$S1 \geq (t1+t2+t3) \quad \text{Expression (4)}$$

That is it is desirable that the shortest distance S1 between the first non-electrode lines 181 to 184 and the second non-electrode lines 211 to 214 be equal to or more than a sum of the layer thickness of the first liquid-crystal layer 9, the layer thickness of the third laminate 5C, and the layer thickness of the second liquid-crystal layer 10 in the direction in which the divided first electrodes 18 are arranged.

For example, the dimensions in this embodiment are as follows: t1=12 μm, t2=12 μm, and t3=188 μm. Therefore, setting of S1≥212 μm prevents the first non-electrode lines 181 to 184 and the second non-electrode lines 211 to 214 from overlapping with each other when viewed from the direction with an angle of 45° or more with respect to the light control film 1A and makes the areas corresponding to the first non-electrode lines 181 to 184 and the second non-electrode lines 211 to 214 less prominent.

It is desirable that the shortest distance S1 described above be equal to or less than ½ of the shortest interval between the first non-electrode lines 181 to 184. This is because possible exceeding of the range described above causes the first non-electrode lines 181 to 184 and second non-electrode lines 211 to 214 that are disposed next to be close.

There is an advantageous effect of preventing moire in addition to the advantageous effect of disposition where the first non-electrode lines 181 to 184 and the second non-electrode lines 211 to 214 do not overlap with each other when viewed from the direction normal to the light control film 1A as in this embodiment. If the first non-electrode lines 181 to 184 and the second non-electrode lines 211 to 214 overlap with each other when viewed from the direction normal to the light control film 1A, there is a possibility that moire is visually identified. More specifically, the third base material 20 is provided between the first non-electrode lines 181 to 184 and the second non-electrode lines 211 to 214. The first non-electrode lines 181 to 184 and the second non-electrode lines 211 to 214 are apart from each other by the layer thickness of the third base material 20. Consequently, when observed from a position close to the direction normal to the light control film 1A, the first non-electrode lines 181 to 184 and the second non-electrode lines 211 to 214 are observed to deviate slightly owing to parallax, which possibly makes the lines observed as moire. As described above, in this embodiment, the first non-electrode lines 181 to 184 and the second non-electrode lines 211 to 214 are disposed so as not to overlap with each other when viewed from the direction normal to the light control film 1A as in the embodiment, which prevents the first non-electrode lines 181 to 184 and the second non-electrode lines 211 to 214 from being visually identified as moire.

According to the first embodiment described above, the first non-electrode lines 181 to 184 and the second non-electrode lines 211 to 214 are disposed so as not to overlap with each other when viewed from the direction normal to the light control film 1A. Therefore, the transmissive area (non-electrode area) corresponding to any of the first non-electrode lines 181 to 184 and the second non-electrode lines 211 to 214 in the light blocking area is not visually identified, which provides the light control member having a higher quality. It is possible for the light control film 1A in the first embodiment to control external light blocking and transmission not only in the lateral direction as with curtain opening and closing but also in the vertical direction as with blind opening and closing. The light control film 1A in the first embodiment selectively controls external light blocking and transmission. Consequently, the light control film 1A in the first embodiment blocks and transmits light in various manners. According to the first embodiment, the first non-electrode lines 181 to 184 and the second non-electrode lines 211 to 214 are prevented from being visually identified as moire.

Second Embodiment

FIG. 9 is a sectional view showing a schematic configuration of a light control film 1B in a second embodiment. A light control film 1B in the second embodiment is different from the first embodiment in positions where first electrodes 24, second electrodes 27, a first common electrode 25 and a second common electrode 26 are laminated. Other configurational aspects of the light control film 1B in the second embodiment are the same as those in the first embodiment. Accordingly, FIG. 9 only shows a sectional view showing characteristic aspects in the second embodiment, and other illustrations are omitted. In the description and the drawings of the second embodiment, members and the like having functions similar to those in the first embodiment are assigned the same symbols, and redundant description will be omitted. The laminates are assigned the same symbols as those in the first embodiment except for some components.

The light control film 1B in the second embodiment includes a first laminate 5A, a second laminate 5B, a third laminate 5C, a first liquid-crystal layer 9, and a second liquid-crystal layer 10. In the first laminate 5A, the first electrodes 24 are laminated on a Z2 side of a first base material 6, and an alignment layer 13 is laminated further thereon (Z2 side). Similar to the first electrodes 18 in the first embodiment, the first electrodes 24 are configured as a plurality of divided partial electrodes 24A to 24E that are electrically insulated from each other. The partial electrodes 24A to 24E are similar to the partial electrodes 18A to 18E in the first embodiment except that the lamination positions are different.

In the second laminate 5B, the second electrodes 27 are laminated on the Z1 side of a second base material 15, and an alignment layer 17 is laminated further thereon (Z1 side). Similar to the second electrodes 21 in the first embodiment, the second electrodes 27 are configured as a plurality of divided partial electrodes 27A to 27E that are electrically insulated from each other. The partial electrodes 27A to 27E are similar to the partial electrodes 21A to 21E in the first embodiment except that the lamination positions are different.

The third laminate 5C includes a first common electrode 25 and an alignment layer 19 on the Z1 side of a third base material 20 and further includes a second common electrode 26 and an alignment layer 22 on the Z2 side of the third base material 20. The first common electrode 25 is a transparent conductive film formed over the entire surface on the Z1 side of the third base material 20. The second common electrode 26 is a transparent conductive film formed over the entire surface on the Z2 side of the third base material 20. The first common electrode 25 and the second common electrode 26 are respectively similar to the first common electrode 14 and the second common electrode 23 in the first embodiment except that the lamination positions are different.

Similar to the relationship between the first non-electrode lines 181 to 184 and the second non-electrode lines 211 to 214, also in the light control film 1B in the second embodiment, first non-electrode lines 241 to 244 and second non-electrode lines 271 to 274 are disposed so as not to overlap with each other when viewed from the direction normal to the light control film 1B.

According to the second embodiment described above, the first non-electrode lines 241 to 244 and the second non-electrode lines 271 to 274 are disposed so as not to overlap with each other when viewed from the direction normal to the light control film 1B. Therefore, any transmissive area (non-electrode area) corresponding to any of the first non-electrode lines 241 to 244 and the second non-electrode lines 271 to 274 in the light blocking area is not visually identified, which provides the light control member having a higher quality. It is possible for the light control film 1B in the second embodiment to control external light blocking and transmission not only in the lateral direction as with curtain opening and closing but also in the vertical direction as with blind opening and closing. The light control film 1B in the second embodiment selectively controls external light blocking and transmission. Consequently, the light control film 1B in the second embodiment blocks and transmits light in various manners. Similar to the first embodiment, the second embodiment also prevents visual identification of moire.

Third Embodiment

FIG. 10 is a sectional view showing a schematic configuration of a light control film 1C in a third embodiment. The light control film 1C in the third embodiment is different from the first embodiment in positions where first electrodes 24, second electrodes 27, a first common electrode 25 and a second common electrode 26 are laminated. The other configurational aspects of the light control film 1C in the third embodiment are the same as those in the first embodiment. Accordingly, FIG. 10 only shows a sectional view showing characteristic aspects in the third embodiment, and other illustrations are omitted. In the description and the drawings of the third embodiment, members and the like having functions similar to those in the first and second embodiments are assigned the same symbols, and redundant description is omitted. The laminates are assigned the same symbols as those in the first and second embodiments except for some components.

The light control film 1C in the third embodiment includes a first laminate 5A, a second laminate 5B, a third laminate 5C, a first liquid-crystal layer 9, and a second liquid-crystal layer 10. In the first laminate 5A, a first common electrode 28 is laminated on a Z2 side of a first base material 6, and an alignment layer 13 is laminated further thereon (Z2 side). The first common electrode 28 is a transparent conductive film formed over the entire surface on the first base material 6. The first common electrode 28 is similar to the first common electrode 14 in the first embodiment.

In the second laminate 5B, second electrodes 32 are laminated on a Z1 side of the second base material 15, and the alignment layer 17 is laminated further thereon (Z1 side). Similar to the second electrodes 21 in the first embodiment, the second electrodes 32 are configured as a plurality of divided partial electrodes 32A to 32E that are electrically insulated from each other. The partial electrodes 32A to 32E are similar to the partial electrodes 21A to 21E in the first embodiment except that the lamination positions are different.

The third laminate 5C includes first electrodes 29, and an alignment layer 19 on the Z1 side of a third base material 20. Similar to the first electrodes 18 in the first embodiment, the first electrodes 29 are configured as a plurality of divided partial electrodes 29A to 29E that are electrically insulated from each other. The partial electrodes 29A to 29E are similar to the partial electrodes 18A to 18E in the first embodiment. The third laminate 5C includes a second common electrode 31, and an alignment layer 22 on the Z2 side of the third base material 20. The second common electrode 31 is a transparent conductive film formed over the entire surface on the Z2 side of the third base material 20. The second common electrode 31 is similar to the second common electrode 23 in the first embodiment except that the lamination positions are different.

Similar to the relationship between the first non-electrode lines 181 to 184 and the second non-electrode lines 211 to 214 in the first embodiment, first non-electrode lines 291 to 294 and second non-electrode lines 321 to 324 are also disposed so as not to overlap each other in the light control film 1C in the third embodiment, when viewed from a direction normal to the light control film 1C.

According to the third embodiment described above, the first non-electrode lines 291 to 294 and the second non-electrode lines 321 to 324 are disposed so as not to overlap with each other when viewed from the direction normal to the light control film 1C. Therefore, any transmissive area (non-electrode area) corresponding to any of the first non-electrode lines 291 to 294 and the second non-electrode lines 321 to 324 in the light blocking area is not visually identified, which provides a light control member having higher quality. It is possible for the light control film 1C in the third embodiment to control external light blocking and transmission not only in the lateral direction as with curtain opening and closing but also in the vertical direction as with blind opening and closing. The light control film 1C in the third embodiment selectively controls external light blocking and transmission. Consequently, the light control film 1C in the third embodiment blocks and transmits light in various manners. Similar to the first embodiment, the third embodiment also prevents visual identification of moire.

Fourth Embodiment

Figure 11:
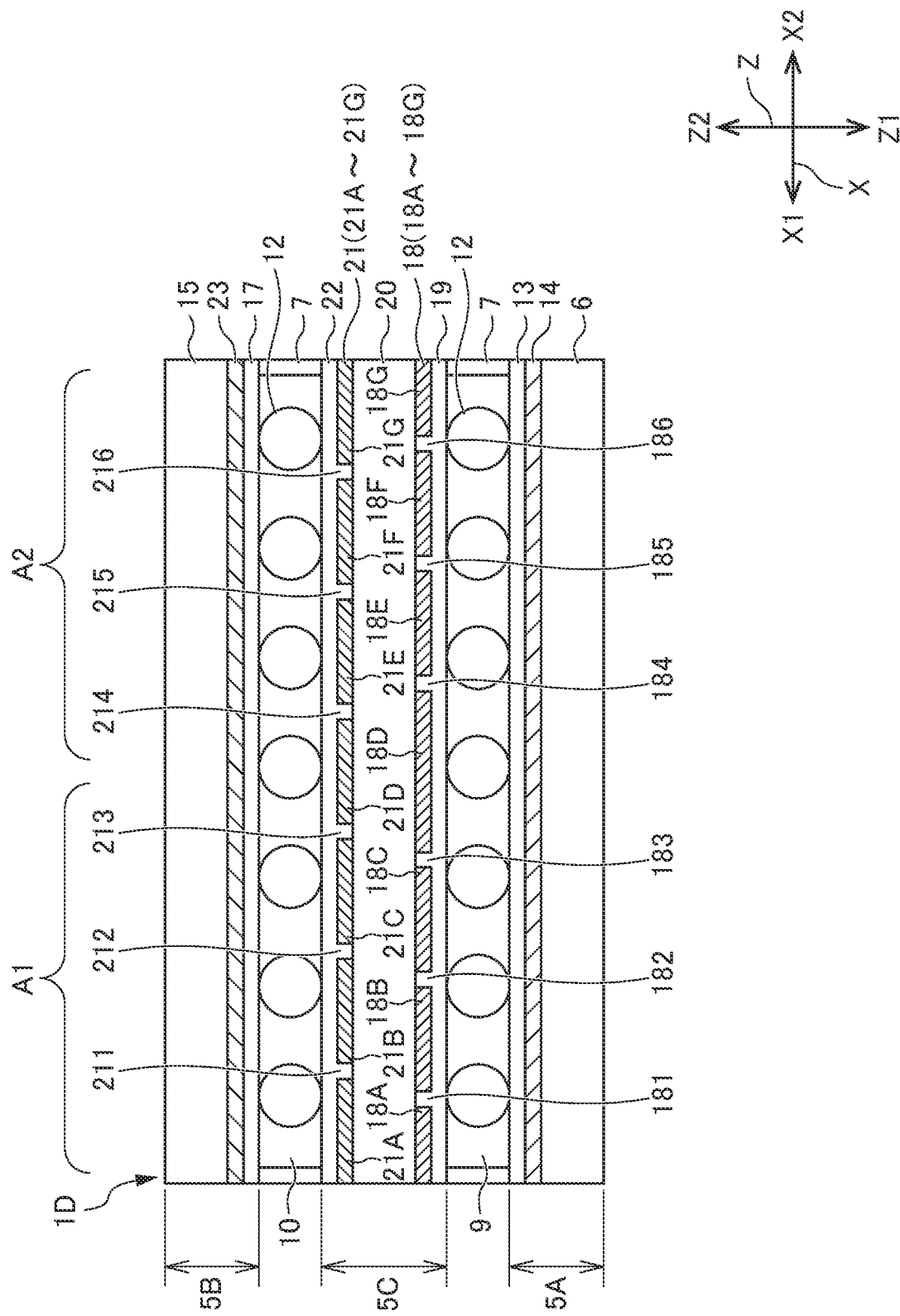
FIG. 11 is a sectional view showing a schematic configuration of a light control film 1D in a fourth embodiment.

FIG. 11 is a sectional view showing a schematic configuration of a light control film 1D in a fourth embodiment. The light control film 1D in the fourth embodiment is different from the first embodiment in pattern of disposing divided partial electrodes (division pattern). Other configurational aspects of the light control film 1D in the fourth embodiment are the same as those in the first embodiment. Accordingly, FIG. 11 only shows a sectional view showing characteristic configurational aspects in the fourth embodiment, and other illustrations are omitted. In the description and the drawings of the fourth embodiment, members and the like having functions similar to those in the first embodiment are assigned the same symbols, and redundant description is omitted.

In the light control film 1D in the fourth embodiment, first electrodes 18 are configured as seven divided partial electrodes 18A to 18G. Between these partial electrodes 18A to 18G, first non-electrode lines 181 to 186 that divide the first electrodes 18 are provided. Likewise, second electrodes 21 are configured as seven divided partial electrodes 21A to 21G. Between these partial electrodes 21A to 21G, second non-electrode lines 211 to 216 that divide the second electrodes 21 are provided. The light control film 1D in the fourth embodiment has two areas A1 and A2 that are disposed to have different deviations in orientation between the first non-electrode lines 181 to 186 and the second non-electrode lines 211 to 216 without overlapping. More specifically, in the area A1, the first non-electrode lines 181, 182, and 183 are disposed to deviate on an X1 side with reference to the second non-electrode lines 211, 212, and 213. On the other hand, in the area A2 on an X2 side of the area A1, the first non-electrode lines 184, 185, and 186 are disposed to deviate on the X2 side with reference to the second non-electrode lines 214, 215, and 216.

Figure 12:
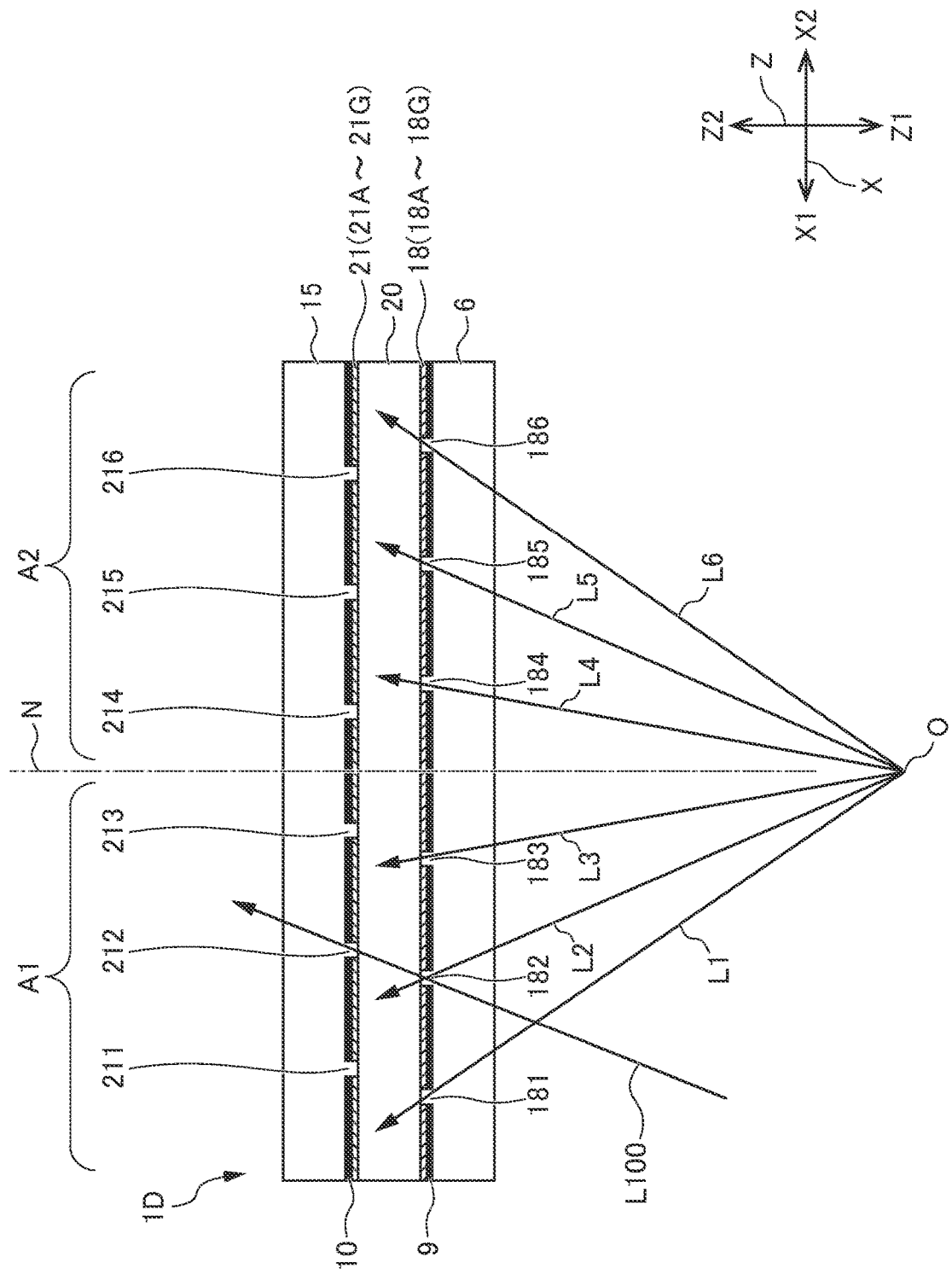
FIG. 12 illustrates why two areas A1 and A2 are provided where deviations between first non-electrode lines 181 to 186 and second non-electrode lines 211 to 216 which do not overlap with each other are oriented in different directions in the fourth embodiment.

FIG. 12 illustrates why the two areas A1 and A2 are provided that are disposed to have different deviations in orientation between the first non-electrode lines 181 to 186 and the second non-electrode lines 211 to 216 without overlapping in the fourth embodiment. It is assumed in FIG. 12 that both the first liquid-crystal layer 9 and the second liquid-crystal layer 10 are in the light blocking state. Note that illustration of a seal material 7, spacers 12, an alignment layer 13, an alignment layer 17, an alignment layer 19, an alignment layer 22, a first common electrode 14, a second common electrode 23 and the like is omitted in FIG. 12. It is assumed in FIG. 12 that an observation position O is on a normal N passing through a midpoint of the light control film 1D in an X-direction. A boundary between the areas A1 and A2 serves as the normal N passing through the midpoint of the light control film 1D in the X-direction.

As described above, the first non-electrode lines 181, 182, and 183 are disposed to deviate on the X1 side with reference to the second non-electrode lines 211, 212, and 213 in the area A1. Therefore, lines of sight L1, L2, and L3 passing through the first non-electrode lines 181, 182, and 183 in oblique directions do not pass through the second non-electrode lines 211, 212, and 213, and are blocked by light blocking areas in the second liquid-crystal layer 10 in the area A1, when the light control film 1D is observed from the observation position O. The first non-electrode lines 184, 185, and 186 are disposed to deviate on the X2 side with reference to the second non-electrode lines 214, 215, and 216 in the area A2. Therefore, similar to the area A1, lines of sight L4, L5, and L6 passing through the first non-electrode lines 184, 185, and 186 in oblique directions do not pass through the second non-electrode lines 214, 215, and 216, and are blocked by light blocking areas in the second liquid-crystal layer 10 in the area A2, when the light control film 1D is observed from the observation position O. That is the relative positions of the first non-electrode lines 181 to 186 and the second non-electrode lines 211 to 216 are configured to achieve an orientation where the first non-electrode lines 181 to 186 and the second non-electrode lines 211 to 216 are in a less overlapping arrangement on a line of sight assumed from the specific observation position O. As described above, the two areas A1 and A2 having different deviations in orientation between the first non-electrode lines 181 to 186 and the second non-electrode lines 211 to 216 without overlapping thus exist. Here, the disposition where the first non-electrode lines 181 to 186 and the second non-electrode lines 211 to 216 unlikely overlap with each other on the line of sight assumed from the observation position O (hereinafter, preferable non-electrode line disposition) is defined as follows. The preferable non-electrode line disposition is where the non-electrode lines closer to the observation position O (the first non-electrode lines 181 to 186 in FIG. 12) deviate further away from the normal N to the light control film 1D drawn from the observation position O than the non-electrode lines more apart from the observation position O (the second non-electrode lines 211 to 216 in FIG. 12).

Here, a line of sight L100 passing through the first non-electrode line 182 and subsequently through the second non-electrode line 212 is not blocked by light blocking areas of the second liquid-crystal layer 10. Consequently, with respect to a line of sight such as the line of sight L100, the elongated areas in the transmitting state corresponding to the first non-electrode line 182 and the second non-electrode line 212 in the light blocking area are visually identified even in the light blocking area. The line of sight allowing visual identification through the first non-electrode line and the second non-electrode line, such as this L100, is possibly present not only in the fourth embodiment but also any of the first to third embodiments described above. A phenomenon that such elongated areas in the light transmitting state are visually identified even in the light blocking area occurs when the position of the line of sight is moved. The phenomenon also possibly occurs due to the relationship between: the relative positional relationship of the first non-electrode lines and the second non-electrode lines at the light control film that are observed even when the observation position is fixed; and the angle of the line of sight in the oblique direction.

However, as described above, the fourth embodiment is provided with the two areas A1 and A2 that are disposed to have different deviations in orientation between the first non-electrode lines 181 to 186 and the second non-electrode lines 211 to 216 without overlapping. Accordingly, the phenomenon that the areas in the transmitting state are observed even in the light blocking area may be effectively prevented from the proximity to the observation position O. Therefore, over the entire surface of the light control film 1D, the areas in the transmitting state in the light blocking areas are prevented from being visually identified. In particular, in the case of adopting the light control film 1D in the vehicle 40 as shown in FIG. 4 described above, a position where a person is on board in the vehicle is approximately identified. Therefore, the observation position O with respect to the light control film 1D in the vehicle 40 is also approximately identified. In such a case, adoption of the light control film 1D having the configuration in the fourth embodiment effectively prevents at every position on the light control film 1D the phenomenon that the areas in the transmitting state are visually identified in the light blocking area.

According to the fourth embodiment described above, the light control film 1D has the two areas A1 and A2 that are disposed to have different deviations in orientation between the first non-electrode lines 181 to 186 and the second non-electrode lines 211 to 216 without overlapping. Accordingly, the light control film 1D effectively prevents the phenomenon that the areas in the transmitting state are observed even in the light blocking area from the proximity to the observation position O. Therefore, the light control film 1D may be preferably used for the vehicle 40. The light control film 1D in the fourth embodiment controls external light blocking and transmission not only in the lateral direction as with curtain opening and closing but also in the vertical direction as with blind opening and closing. The light control film 1D in the fourth embodiment selectively controls external light blocking and transmission. Consequently, the light control film 1D in the fourth embodiment blocks and transmits light in various manners. Similar to the first embodiment, the fourth embodiment also prevents visual identification of moire.

Fifth Embodiment

FIG. 13 is a sectional view showing a schematic configuration of a light control film 1E in a fifth embodiment. The light control film 1E in the fifth embodiment is similar to the light control film 1B in the second embodiment except that the arrangement of a first liquid-crystal layer 9 and a second liquid-crystal layer 10, and the arrangement of alignment layers (130, 190, 220, 170) are different from those of the alignment layers in the second embodiment. In the description and the drawings in the fifth embodiment, members and the like having functions similar to those in the second embodiment are assigned the same symbols, and redundant description is omitted.

The light control film 1E in the fifth embodiment is different from the light control film 1B in the second embodiment in that alignment layers 130 and alignment layers 170 are divided and separated at the same positions as those of first non-electrode lines 241 to 244 and second non-electrode lines 271 to 274. The alignment layers (alignment layers on the first electrodes) 130 are divided in conformity with the division of first electrodes 24, and are laminated on the respective first electrodes 24. The alignment layers (alignment layers on the second electrodes) 170 are divided in conformity with the division of second electrodes 27, and are laminated on the respective second electrodes 27.

The alignment layers 130 and the alignment layers 170 thus have divided configuration, which allows the alignment layers 130 and the alignment layers 170 to be respectively laminated on the first electrodes 24 and the second electrodes 27, and subsequently allows the first electrodes 24 and the second electrodes 27 to be cut together with the alignment layers 130 and the alignment layers 170, thus achieving the division. Alignment properties are imparted by a rubbing process to all of the alignment layers 130, the alignment layer 190, the alignment layer 220 and the alignment layers 170 in the fifth embodiment. Note that the alignment layers 130, 190, 220 and 170 may be fabricated not necessarily by a rubbing process, but alternatively by applying a forming process and making a fine line convexo-concave shape or by optical alignment.

The alignment layers 130, the alignment layer 190, the alignment layer 220 and the alignment layers 170 have the alignment properties that align liquid crystal molecules in each liquid-crystal layer so as to configure the first liquid-crystal layer 9 and the second liquid-crystal layer 10 to be normally dark. That is the liquid crystal molecules in the first liquid-crystal layer 9 and the second liquid-crystal layer 10 allow each alignment layer to align the liquid crystal molecules so as to be in the light blocking state when no electric field is applied, and be in the transmitting state when an electric field is applied. Specifically, the liquid crystal molecules in the first liquid-crystal layer 9 and the second liquid-crystal layer 10 are aligned in a direction substantially orthogonal to a thickness direction of the liquid-crystal layers when no electric field is applied. Both the first liquid-crystal layer 9 and the second liquid-crystal layer 10 in the fifth embodiment are guest-host type liquid-crystal layers containing dichroism pigments.

Figure 14:
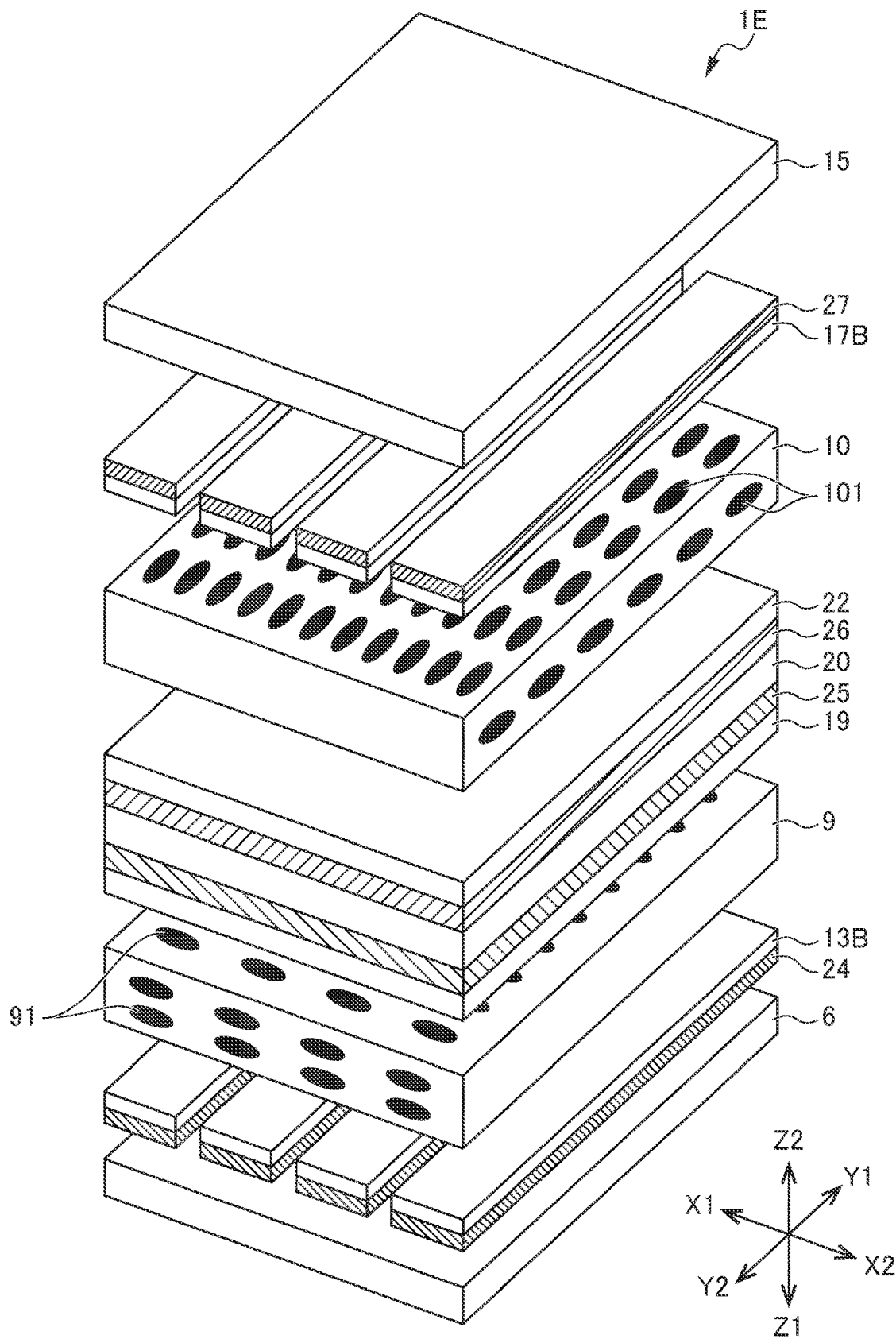
FIG. 14 is an exploded perspective view of the light control film 1E with no electric field (light blocking state)

FIG. 14 is an exploded perspective view of the light control film 1E with no electric field (light blocking state). Note that spacers are omitted and liquid crystal molecules 91 and 101 are represented by elliptical shapes in FIG. 14. As shown in FIG. 14, an alignment direction of the liquid crystal molecules 91 in the first liquid-crystal layer 9 in the light blocking state and an alignment direction of the liquid crystal molecules 101 in the second liquid-crystal layer 10 in the light blocking state intersect with each other when viewed from a direction (Z-axis direction) normal to the light control film 1E. That is the alignment direction of the liquid crystal molecules 91 in the first liquid-crystal layer 9 in the light blocking state is aligned in a direction along an X-axis direction, and the alignment direction of the liquid crystal molecules 101 in the second liquid-crystal layer 10 in the light blocking state is aligned in a direction along a Y-axis direction. As described above, such an intersecting configuration between the alignment direction of the liquid crystal molecules 91 in the first liquid-crystal layer 9 in the light blocking state and the alignment direction of the liquid crystal molecules 101 in the second liquid-crystal layer 10 in the light blocking state when viewed from the direction normal to the light control film 1E improves the light blocking effect of the light control film 1E in the light blocking state, where the first liquid-crystal layer 9 and the second liquid-crystal layer 10 are laminated.

In the light blocking state, the first liquid-crystal layer 9 and the second liquid-crystal layer 10 apply effects similar to those of polarizing plates to light by alignment of the liquid crystal molecules 91 and the liquid crystal molecules 101 in predetermined directions. Therefore, light having passed through the first liquid-crystal layer 9 is in a state where the polarization is aligned in one direction. Accordingly, the light is substantially incapable of passing through the second liquid-crystal layer 10 having the intersecting polarization direction. Therefore, the light control film 1E in this embodiment has favorable light blocking characteristics. It is desirable that the alignment direction of the liquid crystal molecules 91 in the first liquid-crystal layer 9 in the light blocking state and the alignment direction of the liquid crystal molecules 101 in the second liquid-crystal layer 10 in the light blocking state be orthogonal to each other when viewed from a direction (Z-axis direction) normal to the light control film 1E, in order to achieve favorable light blocking characteristics. That is it is desirable to adopt a crossed-nicols arrangement where the transmission axis direction of the first liquid-crystal layer 9 and the transmission axis direction of the second liquid-crystal layer 10 are orthogonal to each other, such that favorable light blocking characteristics are achieved.

The first liquid-crystal layer 9 and the second liquid-crystal layer 10 in the fifth embodiment are disposed between the first electrodes 24 and the second electrodes 27. This disposition is similar to that in the second embodiment, but is a more important configuration in the fifth embodiment. This is related largely to the configuration of the first liquid-crystal layer 9 and the second liquid-crystal layer 10 as normally dark one; the division of the alignment layers 130 and 170; and the intersecting of the directions in which the liquid crystal molecules 91 and the liquid crystal molecules 101 are aligned in the light blocking state. This point will be described in further detail below.

FIG. 15A and FIG. 15B each illustrate an alignment of liquid crystal molecules 101 in a light control film 100B that is normally dark. The light control film 100B includes a non-divided alignment layer 170B and a single liquid-crystal layer 10. FIG. 15A shows a case with no electric field (light blocking state). FIG. 15B shows a case with electric field application (transmitting state). Note that spacers are omitted and the liquid crystal molecules 101 are represented by elliptical shapes in FIG. 15A and FIG. 15B. Portions of the alignment layer 170B in FIG. 15A and FIG. 15B that overlap the second non-electrode lines 271 are uncut and connected. Other portions of the light control film 100B shown in FIG. 15A and FIG. 15B are similar to the portions, which lie on a Z2 side from a third base material 20 of the light control film 1E in the fifth embodiment. In the case in which the alignment layer 170B is undivided, as shown in FIG. 15A, the liquid crystal molecules 101 are aligned in a direction substantially orthogonal to the Z-axis direction over the entire liquid-crystal layer 10 by the alignment forces by the alignment layer 170B and the alignment layer 220 when no electric field is applied (light blocking state). In the case in which the alignment layer 170B is undivided, as shown in FIG. 15B, the liquid crystal molecules 101 are aligned in a direction substantially along the Z-axis direction in ranges overlapping the second electrodes 27 when an electric field is applied (transmitting state). However, in ranges overlapping the second non-electrode lines 271 where the second electrodes 27 are cut out, the liquid crystal molecules 101 do not sufficiently receive the effect of the electric field, and the alignment is disturbed.

FIG. 16A and FIG. 16B each illustrate an alignment of liquid crystal molecules 101 in a light control film 100C that is normally dark, includes divided alignment layers 170, and includes a single liquid-crystal layer 10. FIG. 16A shows a case with no electric field (light blocking state). FIG. 16B shows a case with electric field application (transmitting state). Note that in FIG. 16A and FIG. 16B, spacers are omitted, and liquid crystal molecules 101 are represented by elliptical shapes. The light control film 100C shown in FIG. 16A and FIG. 16B includes components similar to the components, which lie on the Z2 side from the third base material 20 of the light control film 1E in the fifth embodiment. Since the alignment layers 170 are divided, as shown in FIG. 16A, the alignment forces by the alignment layers 170 are not sufficiently received and the alignment is disturbed in ranges that do not overlap the alignment layers 170 and are close to the second non-electrode lines 271 even when no electric field is applied (light blocking state). In the case in which the alignment layers 170 are divided, as shown in FIG. 16B, the liquid crystal molecules 101 are aligned in a direction substantially along the Z-axis direction in ranges overlapping the second electrodes 27 when an electric field is applied (transmitting state). However, in ranges overlapping the second non-electrode lines 271 where the second electrodes 27 are cut out, the liquid crystal molecules 101 do not sufficiently receive the effect of the electric field, and the alignment is disturbed. If the alignment layers are divided and have discontinuities in the normally dark configuration as described above, the alignment is disturbed in ranges close to the second non-electrode lines 271 even when no electric field is applied (light blocking state). Consequently, a problem of the light blocking characteristics in the ranges being lower than those in other regions may occur.

Now, before the purpose for disposing the first liquid-crystal layer 9 and the second liquid-crystal layer 10 between the first electrodes 24 and the second electrodes 27 is described, a case in which the first liquid-crystal layer 9 and the second liquid-crystal layer 10 are not disposed between the first electrodes 24 and the second electrodes 27 is described first.

FIG. 17 illustrates light blocking characteristics of a light control film 1A-2 where neither the first liquid-crystal layer 9 nor the second liquid-crystal layer 10 is disposed between the first electrodes 24 and the second electrodes 27, with no electric field (light blocking state). Note that in FIG. 17, spacers are omitted, and liquid crystal molecules 91 and 101 are represented by elliptical shapes. FIG. 17 shows whether the alignments of the liquid crystal molecules 91 and 101 are uniformly oriented or not. However, since this diagram is two dimensional, the alignments such that the liquid crystal molecules 91 and the liquid crystal molecules 101 are aligned to intersect with each other are not represented (shown as if both are oriented in the same direction). The alignments of the liquid crystal molecules 91 and 101 in FIG. 17 are similar to the alignments described with reference to FIG. 16A and FIG. 16B.

FIG. 17 shows a light beam LA1, a light beam LA2, and a light beam LA3 that enter the light control film 1A-2. The light beam LA1 passes through portions where the liquid crystal molecules 91 and the liquid crystal molecules 101 are aligned in appropriate directions (directions substantially orthogonal to the Z-axis direction) respectively in the first liquid-crystal layer 9 and the second liquid-crystal layer 10. Consequently, the light having passed through the first liquid-crystal layer 9 has a polarization aligned in one direction. Subsequently, the light is substantially blocked when entering the second liquid-crystal layer 10. The light beam LA2 has a polarization aligned in one direction immediately after entering the first liquid-crystal layer 9, but passes through portions where the alignment of the liquid crystal molecules 91 is disturbed before emission from the first liquid-crystal layer 9, so that the polarization is disturbed. Accordingly, even though the liquid crystal molecules 101 are aligned in the appropriate direction (direction substantially orthogonal to the Z-axis direction) in the second liquid-crystal layer 10, an amount of light in polarization that passes through the second liquid-crystal layer 10 increases. Accordingly, the transmissive light increases compared to the light beam LA1. In this manner the first non-electrode lines 182 slightly visible in some cases due to leak of the light. Since the light beam LA3 passes through the portion where the liquid crystal molecules 91 are aligned in an appropriate direction (a direction substantially orthogonal to the Z-axis direction) in the first liquid-crystal layer 9, the polarization is aligned in one direction. However, immediately after entering the second liquid-crystal layer 10, the beam passes through a portion where the alignment of the liquid crystal molecules 101 is disturbed. Accordingly, the polarization is disturbed. Even if the light with the disturbed polarization passes through where the alignment of the liquid crystal molecules 101 in the second liquid-crystal layer 10 is proper, amount of light in polarization that passes through the second liquid-crystal layer 10 increases. Accordingly, the transmissive light increases compared to the light beam LA1. In this manner the first non-electrode lines 182 is slightly visible in some cases due to leak of the light. As described above, according to the light control film 1A-2 shown in FIG. 17, the light beam LA1 is blocked. However, with the light beams LA2 and LA3, the light beams are sometimes slightly visible. Accordingly, the light blocking characteristics may be degraded.

Figure 18:
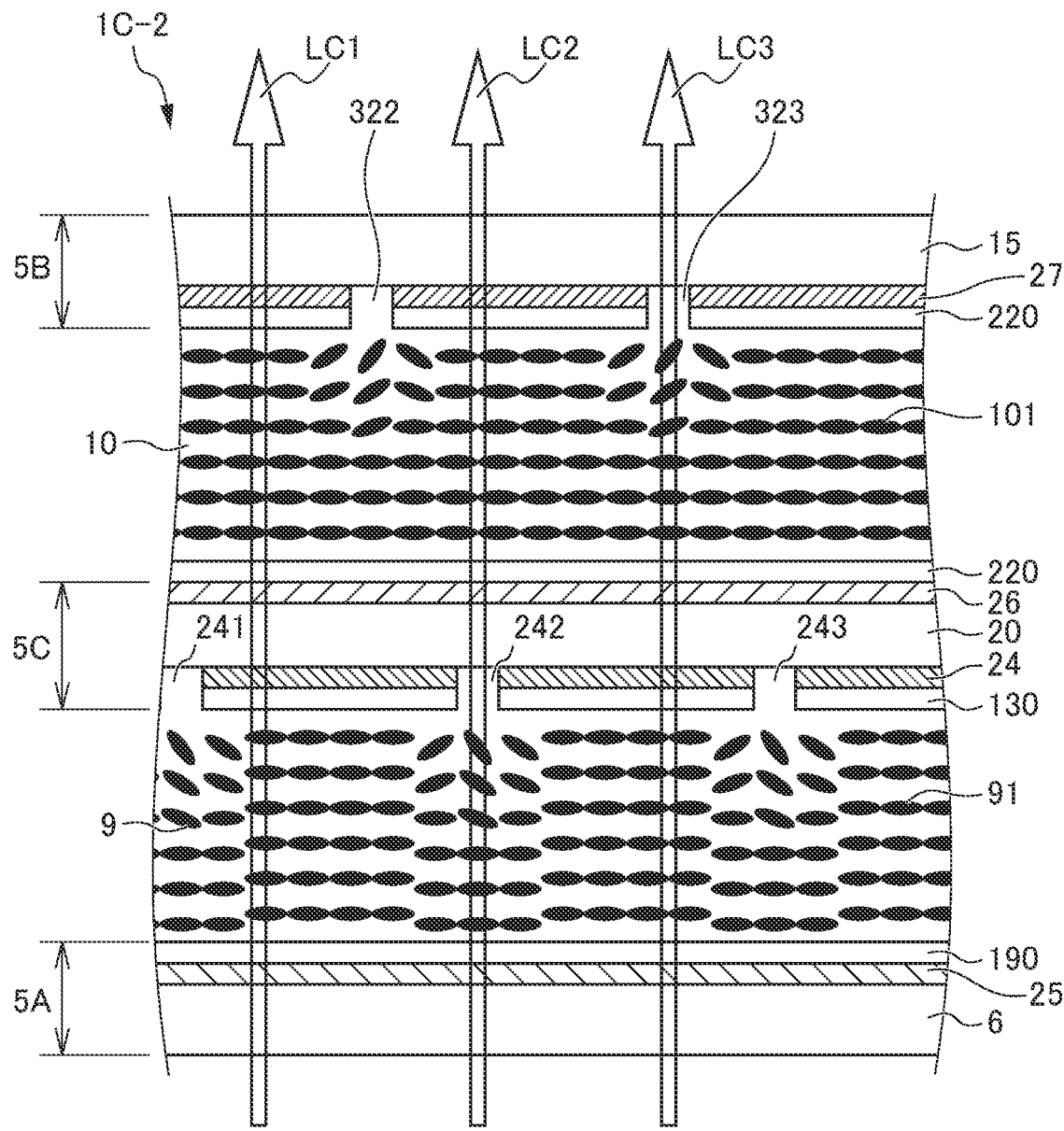
FIG. 18 illustrates light blocking characteristics of a light control film 1C-2 where only a second liquid-crystal layer 10 is disposed between first electrodes 24 and second electrodes 27, and a first liquid-crystal layer 9 is not disposed between the first electrodes 24 and the second electrodes 27, with no electric field (light blocking state)

FIG. 18 illustrates a light blocking characteristics of a light control film 1C-2 where only a second liquid-crystal layer 10 is disposed between first electrodes 24 and second electrodes 27, and a first liquid-crystal layer 9 is not disposed between the first electrodes 24 and the second electrodes 27, with no electric field (light blocking state). Note that in FIG. 18, spacers are omitted, and liquid crystal molecules 91 and 101 are represented by elliptical shapes. FIG. 18 shows whether the alignments of the liquid crystal molecules 91 and 101 are uniformly oriented or not. However, since this diagram is two dimensional, the alignments such that the liquid crystal molecules 91 and the liquid crystal molecules 101 are aligned to intersect with each other are not represented (shown as if both are oriented in the same direction). The alignment of the liquid crystal molecules 91 and 101 in FIG. 18 is similar to the alignment described with reference to FIG. 16A and FIG. 16B.

FIG. 18 shows a light beam LC1, a light beam LC2, and a light beam LC3 that enter the light control film 1C-2. The light beam LC1 passes through portions where the liquid crystal molecules 91 and the liquid crystal molecules 101 are aligned in an appropriate direction (a direction substantially orthogonal to the Z-axis direction) respectively in the first liquid-crystal layer 9 and the second liquid-crystal layer 10. Consequently, the light having passed through the first liquid-crystal layer 9 has a polarization aligned in one direction. Subsequently, the light is substantially blocked when entering the second liquid-crystal layer 10. The light beam LC2 has a polarization aligned in one direction immediately after entering the first liquid-crystal layer 9, but passes through portions where the alignment of the liquid crystal molecules 91 is disturbed before emission from the first liquid-crystal layer 9, so that the polarization is disturbed. Accordingly, even though the liquid crystal molecules 101 are aligned in the appropriate direction (direction substantially orthogonal to the Z-axis direction) in the second liquid-crystal layer 10, an amount of light in polarization that passes through the second liquid-crystal layer 10 increases. Accordingly, the transmissive light increases compared to the light beam LC1. In this manner the first non-electrode lines 182 is slightly visible in some cases due to leak of the light. Since the light beam LC3 passes through the portion where the liquid crystal molecules 91 are aligned in the appropriate direction (direction substantially orthogonal to the Z-axis direction) in the first liquid-crystal layer 9, the polarization is aligned in one direction. Subsequently, the light having entered the second liquid-crystal layer 10 is substantially blocked at a portion where the liquid crystal molecules 101 are aligned in the appropriate direction (direction substantially orthogonal to the Z-axis direction). Accordingly, there is substantially no light that reaches portions where the alignment of the liquid crystal molecules 101 is disturbed. Therefore, the light beam LC3 is substantially blocked. As described above, according to the light control film 1C-2 shown in FIG. 18, the light beam LC1 and the light beam LC3 are blocked. However, with the light beam LC2, the light beam is sometimes slightly visible. Accordingly, the light blocking characteristics are improved compared to the light control film 1A-2, but may not free of degradation.

Figure 19:
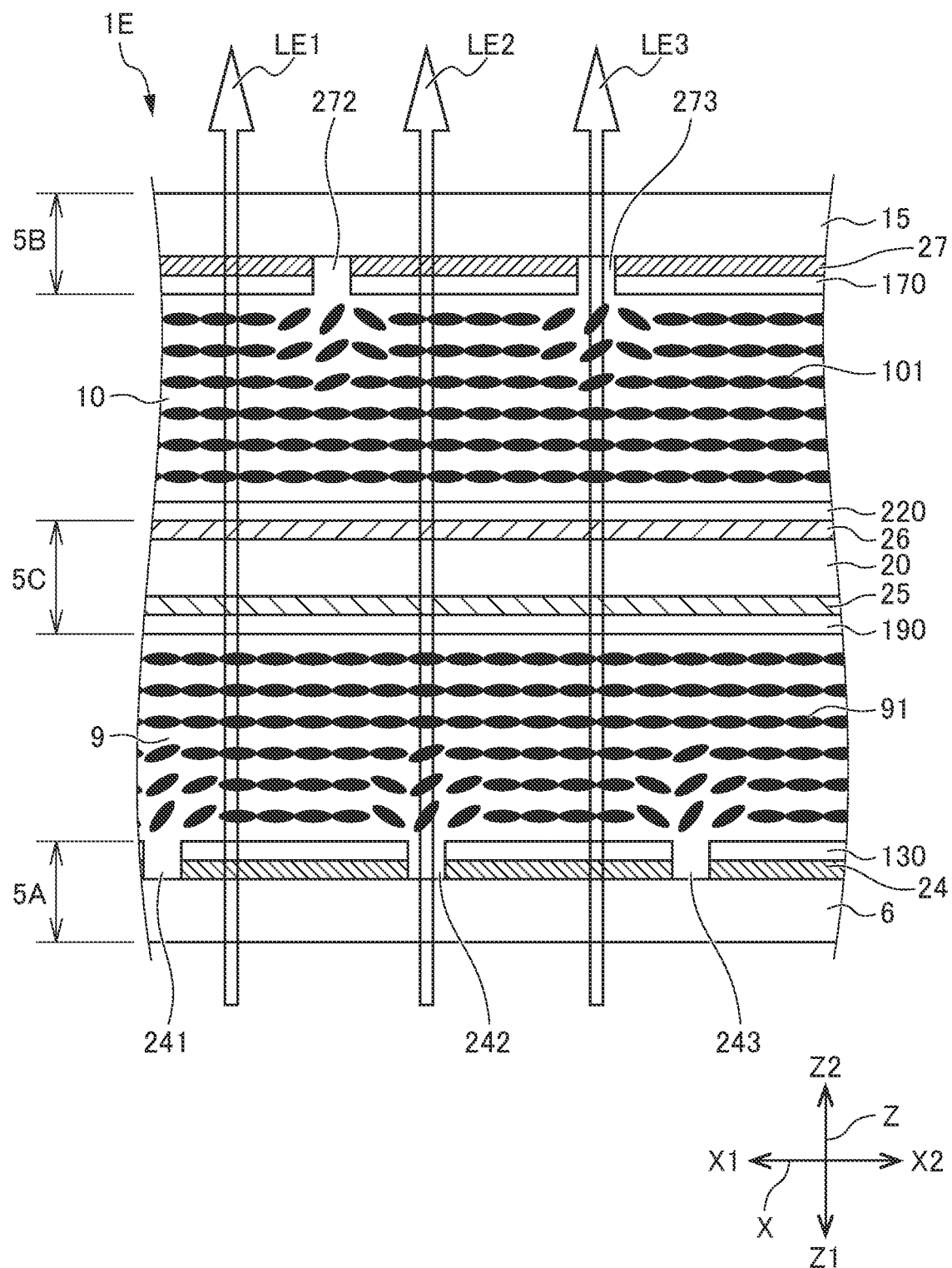
FIG. 19 illustrates light blocking characteristics of a light control film 1E in a fifth embodiment where both a first liquid-crystal layer 9 and a second liquid-crystal layer 10 are disposed between first electrodes 24 and second electrodes 27, with no electric field (light blocking state).

FIG. 19 illustrates light blocking characteristics of the light control film 1E in the fifth embodiment where both the first liquid-crystal layer 9 and the second liquid-crystal layer 10 are disposed between the first electrodes 24 and the second electrodes 27, with no electric field (light blocking state). Note that in FIG. 19, spacers are omitted, and liquid crystal molecules 91 and 101 are represented by elliptical shapes. FIG. 19 shows whether the alignments of the liquid crystal molecules 91 and 101 are uniformly oriented or not. However, since this diagram is two dimensional, the alignments such that the liquid crystal molecules 91 and the liquid crystal molecules 101 are aligned to intersect with each other are not represented (shown as if both are oriented in the same direction). The alignment of the liquid crystal molecules 91 and 101 in FIG. 19 is similar to the alignment described with reference to FIG. 16A and FIG. 16B.

FIG. 19 shows a light beam LE1, a light beam LE2, and a light beam LE3 that enter the light control film 1E. The light beam LE1 passes through portions where the liquid crystal molecules 91 and the liquid crystal molecules 101 are aligned in an appropriate direction (a direction substantially orthogonal to the Z-axis direction) respectively in the first liquid-crystal layer 9 and the second liquid-crystal layer 10. Consequently, the light having passed through the first liquid-crystal layer 9 has a polarization aligned in one direction, so that the light is substantially blocked when entering the second liquid-crystal layer 10. The light beam LE2 passes through a portion where the alignment of the liquid crystal molecules 91 is disturbed immediately after entrance into the first liquid-crystal layer 9, but subsequently, passes through a portion where the liquid crystal molecules 91 are aligned in an appropriate direction (direction substantially orthogonal to the Z-axis direction), so that the polarization is aligned in one direction. When the beam subsequently enters the second liquid-crystal layer 10, the beam is substantially blocked by the portion where the liquid crystal molecules 101 are aligned in an appropriate direction (direction substantially orthogonal to the Z-axis direction). Since the light beam LE3 passes through the portion where the liquid crystal molecules 91 are aligned in the appropriate direction (direction substantially orthogonal to the 2-axis direction) in the first liquid-crystal layer 9, the polarization is aligned in one direction. Subsequently, the light having entered the second liquid-crystal layer 10 is substantially blocked at a portion where the liquid crystal molecules 101 are aligned in the appropriate direction (direction substantially orthogonal to the Z-axis direction). Accordingly, there is substantially no light that reaches portions where the alignment of the liquid crystal molecules 101 is disturbed. Therefore, the light beam LE3 is substantially blocked. As described above, in the light control film 1E in the fifth embodiment shown in FIG. 19, all of the light beam LE1, the light beam LE2, and the light beam LE3 are substantially blocked, and the light blocking characteristics are favorable.

As described above, according to the fifth embodiment, in addition to the advantageous effects in the second embodiment, the light control film 1E that is further excellent in light blocking characteristics is achieved.

Modified Embodiment

Without limitation to the embodiments described above, various modifications and changes may be made, and are also encompassed in the range of the embodiments of the present disclosure.

(1) In each embodiment, the example where the light control films are disposed on the side windows and the in-vehicle partition of the vehicle 40 is described. Without limitation to this for example, a configuration where the light control films are arranged on a front windshield, a roof window and the like of a vehicle may be adopted.

(2) In each embodiment, the example where the light control films having flexibility are provided as light control members on the side windows of a vehicle is described. Without limitation to this for example, a light control member (laminated glass) in which the base material of each light control film described above is glass plate and which has no flexibility may be disposed in the vehicle, instead of each side window. Alternatively, the light control film described above may be held between two transparent plates such as glass plates or resin plates (between the first transparent plate and the second transparent plate) to make a light control device and this light control device may be disposed as each side window of the vehicle.

(3) In each embodiment, the description is made using the example where the vehicle provided with the light control films is an automobile. Without limitation to this for example, the light control film may be applied as each window of a railroad vehicle, a ship, an aircraft, etc., for example. The light control film may be applied not exclusively to the vehicle, but also to for example, a window glass provided in a building, a window for a partition, etc.

(4) In each embodiment, the examples are described where the deviations in orientation without overlapping between the first non-electrode lines and the second non-electrode lines are the same orientation over the entire surface, or the same orientation in each of the areas A1 and A2. Without limitation to this for example, with respect to the relationship between the first non-electrode lines and the second non-electrode lines disposed closest to each other in the direction where the divided first electrodes are arranged, the orientations where the first non-electrode lines and the second non-electrode lines deviate without overlapping may be random. In this case, the phenomenon that the areas in the transmitting state are visually identified also in the light blocking areas can be prevented from frequently occurring in observation from a specific direction.

Note that each of the embodiments and modified embodiments may be used in an appropriately combined manner. However, detailed description is omitted. The embodiments of the present disclosure are not limited by each of the embodiments described above.

EXPLANATION OF REFERENCE SYMBOLS

1A Light control film
1B Light control film
1C Light control film
1D Light control film
1E Light control film
5A First laminate
5B Second laminate
5C Third laminate
6 First base material
7 Seal material
9 First liquid-crystal layer
10 Second liquid-crystal layer
12 Spacers
13 Alignment layer
14 First common electrode
15 Second base material
17 Alignment layer
18 First electrodes
18A to 18G Partial electrodes
19 Alignment layer
20 Third base material
21 Second electrodes
21A to 21G Partial electrodes
22 Alignment layer
23 Second common electrode
24 First electrodes
24A to 24E Partial electrodes
25 First common electrode
26 Second common electrode
27 Second electrodes
27A to 27E Partial electrodes
28 First common electrode
29 First electrodes
29A to 29E Partial electrodes
31 Second common electrode
32 Second electrodes
32A to 32E Partial electrodes
40 Vehicle
41A Front seat side window
41B Rear seat side window
41C Front seat side window
41D Rear seat side window
42 Operation information acquisition unit
43 Power source unit
44 Drive control unit
45 In-vehicle partition
91 Liquid crystal molecules
100 Light control film
100B Light control film
100C Light control film
1A-2 Light control film
1C-2 Light control film
101 Liquid crystal molecules
130 Alignment layer
170 Alignment layer
170B Alignment layer
190 Alignment layer
220 Alignment layer
181 to 186 First non-electrode lines
211 to 216 Second non-electrode lines
241 to 244 First non-electrode lines
271 to 274 Second non-electrode lines
291 to 294 First non-electrode lines
321 to 324 Second non-electrode lines
A1 Area
A2 Area
L1 to L6 Line of sight
L100 Line of sight
N Normal
O Observation position

The invention claimed is:

1. A light control member having a controllable transmittance, comprising:
an undivided first common electrode;
divided first electrodes;
a first liquid-crystal layer disposed between the first common electrode and the first electrodes;
an undivided second common electrode;
divided second electrodes;
a second liquid-crystal layer disposed between the second common electrode and the second electrodes;
first non-electrode lines that divide the first electrodes; and
second non-electrode lines that divide the second electrodes,
wherein the first and second non-electrode lines are disposed at positions where the first and second non-electrode lines do not overlap with each other when viewed from a direction normal to the light control member.

2. The light control member according to claim 1, further comprising:
a first laminate that includes a first base material;
a second laminate that includes a second base material; and
a third laminate that includes a third base material, wherein,
the first liquid-crystal layer is held between the first laminate and the third laminate,
the second liquid-crystal layer is held between the second laminate and the third laminate,
the first non-electrode lines and the second non-electrode lines each have a width equal to or less than 50 µm, and
a shortest distance between the first non-electrode lines and the second non-electrode lines is equal to or more than a sum of a layer thickness of the first liquid-crystal layer, a layer thickness of the third laminate, and a layer thickness of the second liquid-crystal layer, when viewed in a direction in which the divided first electrodes are arranged.

3. The light control member according to claim 1, wherein the first non-electrode lines and the second non-electrode lines each have a width equal to or less than 50 µm, and
a shortest distance between the first non-electrode lines and the second non-electrode lines is equal to or less than ½ of a shortest interval between the first non-electrode lines which are adjacent to each other, when viewed in a direction in which the divided first electrodes are disposed.

4. The light control member according to claim 1, wherein the first non-electrode lines and the second non-electrode lines do not overlap with each other when viewed from a direction forming an angle of 45° or more with the light control member.

5. The light control member according to claim 1, wherein with respect to relationships between the first non-electrode lines and the second non-electrode lines that are disposed closest in a direction in which the divided first electrodes are arranged, the light control member has two areas that are disposed to have different deviations in orientation of the first non-electrode lines with reference to the second non-electrode lines.

6. The light control member according to claim 1, further comprising:
alignment layers on the first electrodes, the alignment layers being divided and laminated respectively on the first electrodes in accordance with division of the first electrodes; and
alignment layers on the second electrodes, the alignment layers being divided and laminated respectively on the second electrodes in accordance with division of the second electrodes, wherein
the first liquid-crystal layer and the second liquid-crystal layer are configured to be normally dark so as to be in a light blocking state when no electric field is applied and in a transmitting state when an electric field is applied,
an alignment direction of liquid crystal molecules in the first liquid-crystal layer in the light blocking state and an alignment direction of liquid crystal molecules in the second liquid-crystal layer in the light blocking state intersect with each other when viewed from the direction normal to the light control member, and
the first liquid-crystal layer and the second liquid-crystal layer are disposed between the first electrodes and the second electrodes.

7. The light control member according to claim 6, wherein the alignment direction of liquid crystal molecules in the first liquid-crystal layer in the light blocking state and the alignment direction of liquid crystal molecules in the second liquid-crystal layer in the light blocking state are orthogonal to each other when viewed from the direction normal to the light control member.

8. A light control device, comprising:
a first transparent plate;
a second transparent plate disposed opposite to the first transparent plate; and
the light control member according to claim 1 which is provided between the first transparent plate and the second transparent plate.

9. A light control device, comprising:
a first transparent plate;
a second transparent plate disposed opposite to the first transparent plate; and
the light control member according to claim 2 which is provided between the first transparent plate and the second transparent plate.

10. A light control device, comprising:
a first transparent plate;
a second transparent plate disposed opposite to the first transparent plate; and
the light control member according to claim 3 which is provided between the first transparent plate and the second transparent plate.

11. A light control device, comprising:
a first transparent plate;
a second transparent plate disposed opposite to the first transparent plate; and
the light control member according to claim 4 which is provided between the first transparent plate and the second transparent plate.

12. A light control device, comprising:
a first transparent plate;
a second transparent plate disposed opposite to the first transparent plate; and
the light control member according to claim 5 which is provided between the first transparent plate and the second transparent plate.

13. A light control device, comprising:
a first transparent plate;
a second transparent plate disposed opposite to the first transparent plate; and
the light control member according to claim 6 which is provided between the first transparent plate and the second transparent plate.

14. A light control device, comprising:
a first transparent plate;
a second transparent plate disposed opposite to the first transparent plate; and
the light control member according to claim 7 which is provided between the first transparent plate and the second transparent plate.

* * * * *